(12) United States Patent
Bybee et al.

(10) Patent No.: US 7,213,212 B2
(45) Date of Patent: May 1, 2007

(54) XGL AND MULTI-PLATFORM USER INTERFACE ENGINE

(75) Inventors: Andrew G. Bybee, Redmond, WA (US); Christopher A. Evans, Sammamish, WA (US); Chad C. Neff, Everett, WA (US); Pritvinath Obla, Kirkland, WA (US); Leslie S. Yeh, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 10/161,895

(22) Filed: Jun. 3, 2002

(65) Prior Publication Data

US 2003/0222920 A1 Dec. 4, 2003

(51) Int. Cl.
*G06F 3/00* (2006.01)
*G06F 3/01* (2006.01)

(52) U.S. Cl. .................. 715/760; 715/744; 717/174

(58) Field of Classification Search ................ 715/705, 715/788, 809, 762, 763, 760; 719/309
See application file for complete search history.

(56) References Cited

U.S. PATENT DOCUMENTS

| | | | |
|---|---|---|---|
| 5,301,326 A | | 4/1994 | Linnett et al. |
| 5,801,692 A | | 9/1998 | Muzio et al. |
| 5,924,101 A | * | 7/1999 | Bach et al. ............. 707/103 R |
| 6,104,393 A | * | 8/2000 | Santos-Gomez ............ 715/763 |
| 6,161,176 A | | 12/2000 | Hunter et al. |
| 6,199,082 B1 | | 3/2001 | Ferrel et al. |
| 6,263,352 B1 | * | 7/2001 | Cohen ......................... 715/513 |
| 6,476,828 B1 | * | 11/2002 | Burkett et al. .............. 715/760 |
| 6,502,234 B1 | * | 12/2002 | Gauthier et al. ............ 717/107 |
| 6,806,890 B2 | * | 10/2004 | Audleman et al. .......... 715/762 |
| 6,833,847 B1 | * | 12/2004 | Boegner et al. ............ 715/705 |
| 6,871,340 B1 | * | 3/2005 | Gillis ......................... 717/100 |
| 6,912,710 B2 | * | 6/2005 | Broussard et al. .......... 717/170 |
| 6,948,151 B2 | * | 9/2005 | Gerken ....................... 717/108 |
| 6,968,551 B2 | * | 11/2005 | Hediger et al. ............. 717/174 |
| 2002/0055928 A1 | * | 5/2002 | Worthington ............... 707/102 |
| 2002/0158894 A1 | * | 10/2002 | Stoll et al. .................. 345/705 |
| 2002/0188941 A1 | * | 12/2002 | Cicciarelli et al. .......... 717/175 |
| 2004/0001092 A1 | * | 1/2004 | Rothwein et al. ........... 345/763 |
| 2004/0010598 A1 | * | 1/2004 | Bales et al. ................. 709/228 |
| 2004/0021679 A1 | * | 2/2004 | Chapman et al. ........... 345/700 |
| 2004/0036719 A1 | * | 2/2004 | Van Treeck ................. 345/763 |

OTHER PUBLICATIONS

Joe Winchester et al, "Building a custom layout manager", Dec. 2001, http://www-106.ibm.com/developerworks/library/us-customer/?dwzone=usability pp. 1-8.*

(Continued)

*Primary Examiner*—Weilun Lo
*Assistant Examiner*—Steven Theriault
(74) *Attorney, Agent, or Firm*—Christensen O'Connor Johnson & Kindness PLLC

(57) ABSTRACT

The present invention relates to a system and method for providing dynamic wizard interfaces to end users. In one embodiment, a client device retrieves a container encapsulating a number of packages utilizing a self-describing data format from a remote server. A wizard engine on the client device interprets the container and packages to produce a wizard interface. Preferably, the present invention utilizes a compatible data structure for receiving, saving, and transmitting captured information regarding the wizard interface.

22 Claims, 26 Drawing Sheets

OTHER PUBLICATIONS

Chu, C.-H. et al., "Building a XML-Based Unified User Interface System under J2EE Architecture," 2000 IEEE, Sep. 2000, pp. 208-214.

Mueller, A. et al., "Using XML to Semi-automatically Derive User Interfaces," *Second International Workshop on User Interfaces to Data Intensive Systems*, 2001 IEEE, May. 31-Jun. 1, 2001, pp. 91-95.

Priestley, M., "A Wizard for Wizards: Decision Support for the New or Despairing User," *Conference Proceedings, Scaling the Heights: The Future of Information Technology*, ACM Sigdoc, 1998, pp. 98-102.

Tidwell, D., "IBM's TaskGuide: An XML-based system for creating wizard-style helps," *Markup Languages: Theory & Practice 1.3*, 1999, pp. 23-39.

Tidwell, D. et al., "TaskGuides: Instant Wizards on the Web," *Conference Proceedings: Crossroads in Communication*, ACM Sigdoc, 1997, pp. 262-272.

\* cited by examiner

XGL AND MULTI-PLATFORM USER INTERFACE ENGINE

CROSS-REFERENCE TO RELATED APPLICATIONS

The present invention is related to "DYNAMIC WIZARD INTERFACE SYSTEM AND METHOD," filed concurrently on Jun. 3, 2002 and "XGL AND DYNAMIC ACCESSIBILITY SYSTEM AND METHOD," filed concurrently on Jun. 3, 2002.

FIELD OF THE INVENTION

The present invention relates in general to user interfaces and in particular to a system and method for providing dynamic wizard interfaces to end users.

BACKGROUND OF THE INVENTION

Communication networks are well known in the computer communications field. By definition, a network is a group of computers and associated devices that are connected by communications facilities or links. Network communications can be of a permanent nature, such as via cables, or can be of a temporary nature, such as connections made through telephone or wireless links. Networks may vary in size, from a local area network ("LAN"), consisting of a few computers or workstations and related devices, to a wide area network ("WAN"), which interconnects computers and LANs that are geographically dispersed, to a remote access service ("RAS"), which interconnects remote computers via temporary communication links. An internetwork, in turn, is the joining of multiple computer networks, both similar and dissimilar, by means of gateways or routers, that facilitate data transfer and conversion from various networks. A well-known abbreviation for the term internetwork is "internet." As currently understood, the capitalized term "Internet" refers to collection of networks and routers that use the Internet Protocol ("IP"), along with higher level protocols, such as the Transmission Control Protocol/Internet Protocol ("TCP/IP") or the Uniform Datagram Packet/Internet Protocol ("UDP/IP"), to communicate with one another.

The Internet has recently seen explosive growth by virtue of its ability to link computers located throughout the world. Other interactive environments may include proprietary environments, such as those provided by the Microsoft Network (MSN) or other online service providers, as well as the "wireless Web" provided by various wireless networking providers, especially those in the cellular phone industry. As will be appreciated from the following description, the present invention could apply in any such interactive environments; however, for purposes of discussion, the Internet is used as an exemplary interactive environment for implementing the present invention.

The Internet has quickly become a popular method of disseminating information due in large part to its ability to deliver information in a variety of formats. To make information available over the Internet, a user typically composes a document or other data that resides on a server connected to the Internet that has mass storage facilities for storing documents and/or data and that runs administrative software for handling requests for those stored documents. A common way of addressing a document is through an associated Uniform Resource Locator ("URL") that provides the exact location of a linked document on a server connected to the Internet.

At the start of the Internet, the information stored on the Internet was generally static in nature and, if one wanted to change the information contained in a document on a server, it was necessary to manually configure the document by rewriting the document. However, at the present stage of the development of the Internet, many servers provide dynamic content that changes depending on a user's interaction between the user's consumer device and the server.

Concurrently with the development of the Internet, there has been a number of enhancements to graphical user interfaces ("GUIs") for computer systems. One such GUI is known as a wizard interface, also known as assistants interfaces in some instances. Wizard interfaces are generally a structured series of pages or dialogs that interact with a wizard to allow a user to produce a result. Wizard interfaces and wizard engines are collectively referred to herein as wizards. Unlike other forms of GUIs, such as tutorials and online help screens, wizards also accomplish one or more tasks. Since wizard interfaces were introduced, as shown in U.S. Pat. No. 5,301,326, the text and drawings of which are herein incorporated by reference, they have gained wide acceptance as a way to guide end users through complex tasks. As their acceptance has grown, so too has the complexity of the tasks that wizards have been called upon to perform. In addition, due to the increased usage, different types of individuals are being called upon to contribute to the creation of wizards.

Conventional wizard interfaces are generally hard-coded graphical user interface components require a substantial amount of expertise in software development to design. As the need for wizards has increased, the supply of experienced developers capable of creating and/or overseeing the creation of wizard interfaces has not increased proportionally. Accordingly, there is a need for a way to design wizards without the need for experienced software developers.

Conventional wizard interfaces, when in complete form, are easy to navigate and use for even inexperienced end users. However, altering a wizard interface by adding, deleting, or changing the pages of the wizard interface entails multiple levels of changes that are difficult to perform. For example, adding another branching page to a wizard interface might require all previous and/or subsequent pages to be updated to reflect the new page order. Additionally, all components for all pages in the wizard interface would need to be determined in advance and packaged with the wizard. A wizard interface having five branching pages, each with three possible branches, has over 200 possible page nodes and potentially over 100 variations of just the fifth page. This complexity is only exacerbated when more pages included in a complex wizard interface are added and when wizards provide more than three options in a page. Still further, the ability to integrate live data (e.g., listings of available servers or other real-time information) in conventional wizards is limited by the difficulty of dynamically changing the pages of a wizard interface. Rather, all possible combinations need to be determined in advance. This necessitates even larger and more cumbersome development and deployment of conventional wizards or simply hampers a wizard's ability to respond/interact in an efficient manner. It would be desirable to have an easy-to-use system and method of enhancing wizard interfaces without the increased complexity and/or resources required by previously developed wizard interfaces.

SUMMARY OF THE INVENTION

The present invention is directed to creating a dynamic wizard interface on a wizard engine. In one embodiment, a server computer system receives a request for a dynamic wizard interface from a client device and determines the number of packages that should be included in the dynamic wizard interface. The initial packages are encapsulated in a wizard container and the container is sent to the wizard engine, for interpretation and transformation into the wizard interface. The wizard container and packages utilize a self-describing data format, such as XML, to describe their components. In one particular embodiment of the present invention, a specific set of terms is used to describe the components in the packages and container; this group of terms is referred to as the experience generation language ("XGL"). In general, the packages comprise pages and objects that further describe the wizard interface.

In accordance with additional aspects of the present invention, a computing device has a wizard engine that transforms a wizard container into a wizard interface. The wizard engine extracts a number of packages from the wizard container, each package having a number of objects that correspond to components of a wizard interface. The wizard engine then transforms these objects into the corresponding components of the wizard interface according to an object template. The objects are then laid out according to a layout template after which the wizard engine depicts the first page of the wizard interface to an end user.

In another embodiment of the present invention, the wizard engine resides on a "proxy" device such that it receives the wizard containers and transforms them into representations of a wizard interface which are then passed along to another "client" device. For example, a wizard engine may be running on such a proxy device that transforms the wizard container into Web pages for presenting a representation of a wizard interface to a client device.

In accordance with yet still other aspects of this invention, the next packages to be retrieved from a branching point are cached. This is particularly helpful when the end user's connection speed is slow because, for example, the end user has a low bandwidth connection.

In accordance with further aspects of this invention, an information data structure is provided that has elements matching the self-described objects in the packages of the wizard container. This information data structure may be utilized for storing states and other information between wizard sessions. For example, if a user has already provided their name and address in a previous wizard session, this information may be stored and inserted when this information is required in another wizard session. Additionally, this may also be used when, for whatever reason, a wizard session is cancelled, then the previously entered information for that particular session will be retained so that the end user does not have to reenter the same information into the wizard interface.

As will be readily appreciated from the foregoing summary, the invention provides a new and improved method of transforming a wizard container into a wizard interface in a way that improves the efficiency and manageability of wizard interfaces, and a related system and computer-readable medium.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The detailed description which follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file serves, computer servers and memory storage devices. Each of these conventional distributed computing components is accessible by the processor via a communication network.

Figure 1:
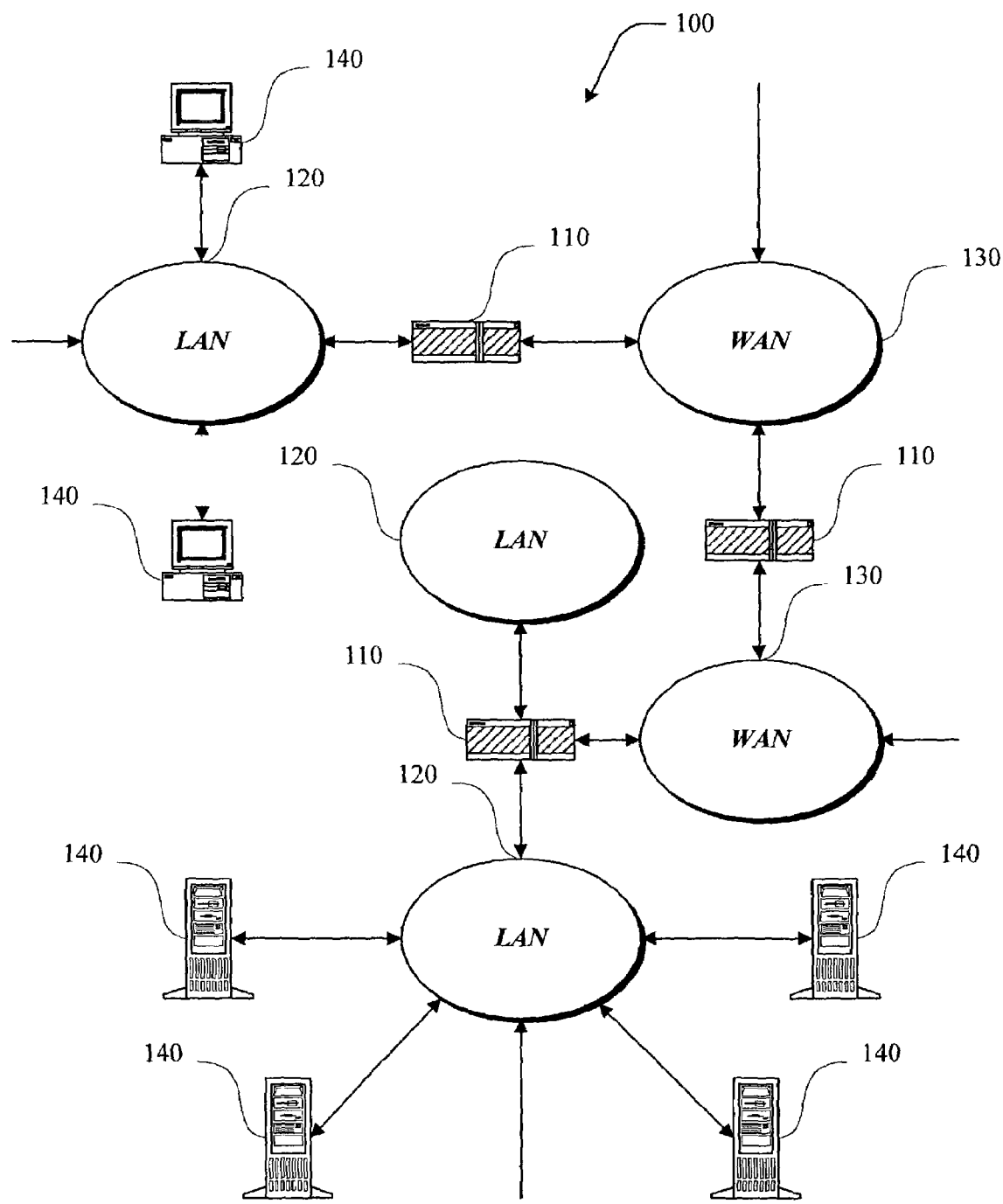
FIG. 1 (prior art) is an illustration of a representative portion of an Internetwork, such as the Internet.

As previously explained, the capitalized term "Internet" refers to the collection of networks and routers that use communications with one another. A representative section of the Internet 100 is shown in FIG. 1. Prior art, more specifically, the representation section of the Internet 100 shown in FIG. 1 includes a plurality of LANs 120 and WANs 130 interconnected by routers 110. The routers 110 are generally special purpose computers used to interface one LAN or WAN to another. Communication links within the LANs may be formed by twisted pair wire, coaxial cable, or any other well known communication linkage technology, including wireless technology. Communication links between networks may be formed by 56 Kbps analog telephone lines, or 1 Mbps digital T-1 lines and/or 45 Mbps T-3 lines or any other well known communication linkage technology, including wireless technology. Further, computers and other related electronic devices 140 can be remotely connected to either the LANs 120 or the WAN 130 via a modem and temporary telephone link, including a wireless telephone link. Such computers and electronic devices 140 are shown in FIG. 1 as connected to one of the LANs 120. It will be appreciated that the Internet 100 comprises a vast number of such interconnected networks, computers, and routers and that only a small, representative section of the Internet 100 is shown in FIG. 1.

Figure 2:
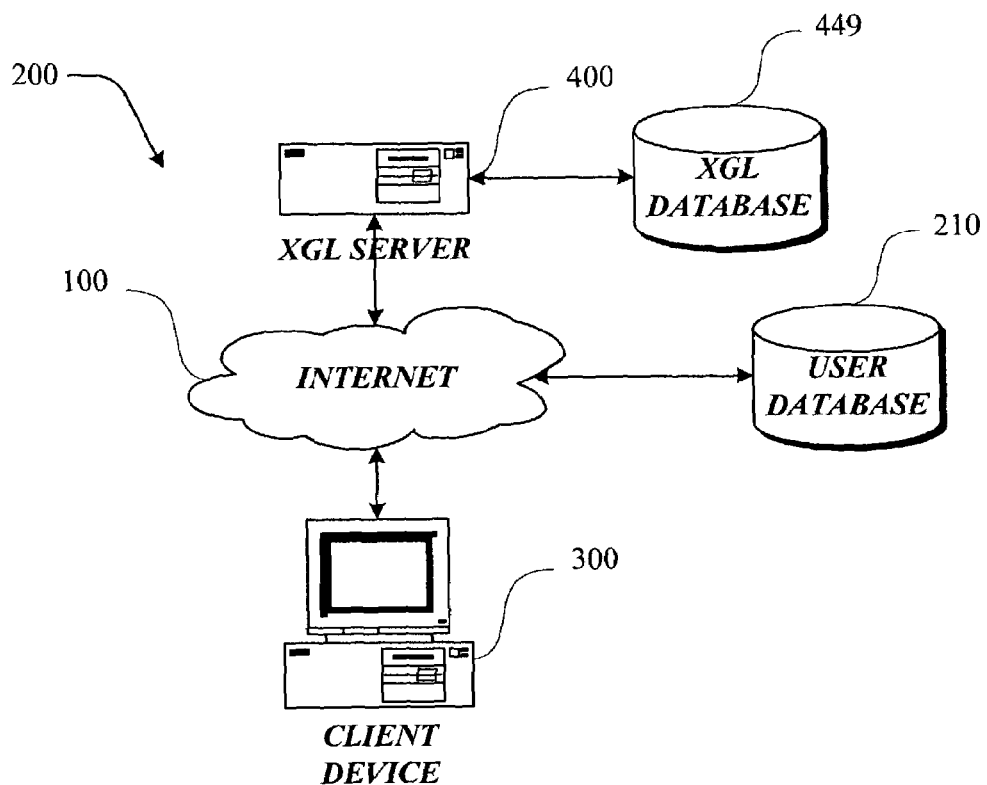
FIG. 2 is a pictorial diagram of a number of devices connected to an Internetwork which provide a client device with a wizard interface in accordance with the present invention.

FIG. 2 illustrates a functional block diagram of a system 200 for providing a dynamic wizard interface. While the system 200 generally operates in a distributed computing environment comprising individual computer systems interconnected over a network (such as the Internet 100), it will be appreciated by those of ordinary skill in the art that the system 200 could equally function as a single stand-alone computer system. The system 200 shown in FIG. 2 includes a client device 300, an XGL server 400, and a user database 210 interconnected over an internetwork, such as the Internet 100. Also shown in FIG. 2 is an XGL database 449 in communication with the XGL server 400. It will be appreciated by those of ordinary skill in the art that the XGL database 449 may reside on the XGL server 400 or that it may reside on another computing device. The client device 300 and the XGL server 400 are further described below in relation to FIGS. 3 and 4, respectively. Additionally, while only one client device 300 has been shown, it will be appreciated that many client devices 300 may be included in the system 200.

Figure 3:
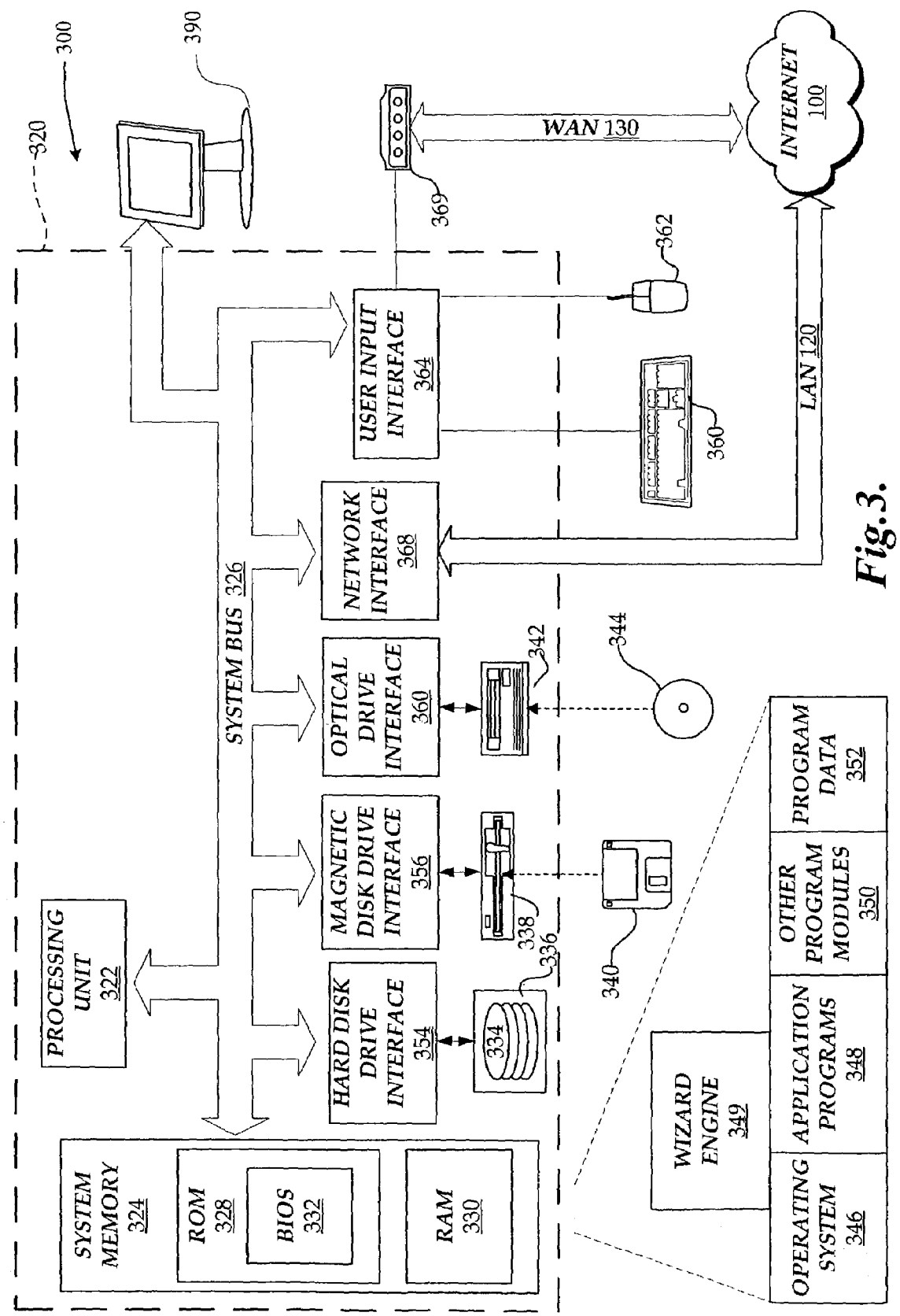
FIG. 3 is a block diagram of a personal computer that provides an exemplary client device suitable for use in implementing the present invention.

FIG. 3 illustrates an exemplary computing system suitable for forming a client device 300. The computing system is only one example of a suitable computing environment and is not intended to suggest any limitation as to the scope of use or of the invention. Neither should the computing environment be interpreted as having any dependency requirement relating to any one or a combination of components illustrated in an exemplary operating environment.

The invention is operational in numerous other general purpose or special computing system environments or configurations. Examples of well known computing systems, environments, and/or configurations that may be suitable for implementing the invention include, but are not limited to, personal computers, server computers, laptop devices, multiprocessor systems, microprocessor-based systems, network PC's, mini-computers, mainframe computers, and distributed computing environments that include any of the above systems or the like.

A client device employed by the invention may be described in the general context of computer-executable instructions, such as program modules being executed by a computer 320 of the type shown in FIG. 3 and described below. Generally, program modules include routines, programs, objects, components, data structures, etc. that perform a particular task or implement particular abstract data types. The invention may also be practiced in distributed computing environments where tasks are performed by remote processing devices that are linked through a communication network. In a distributed computing environment, program modules may be located in both local and remote computer storage media including memory storage devices.

With reference to FIG. 3, an exemplary client device 300 suitable for use in implementing the invention is a general purpose computing device in the form of a computer 320. Components of a computer 320 include, but are not limited to, a processing unit 322, system memory 324, a display 390, and a system bus 326 that couples various system components, including the system memory 324, to the processor 322. The system bus 325 may be any of several types of bus structures, including a memory bus or memory controller, a peripheral bus, and a local bus using any of a variety of bus architectures. By way of example and not limitation, such architectures include industry standard architecture ("ISA") bus, microchannel architecture ("MCA") bus, enhanced ISA ("EISA") bus, video electronic standards association ("VESA") local bus, peripheral component interconnect ("PCI") bus also known as mezzanine bus, and accelerated graphics port ("AGP") bus.

The computer 320 typically includes a variety of computer-readable media. Computer-readable media can be any available media that can be accessed by the computer 320 and includes both volatile/non-volatile media, and removable/non-removable media. By way of example, and not limitation, computer-readable media may comprise computer storage media and communication media. Computer storage media includes, but is not limited to, RAM, ROM, EEPROM, flash memory or other memory technology, CD-ROM, digital versatile disc ("DVD") or other optical storage, magnetic cassettes, magnetic tape, magnetic disk storage or other magnetic storage devices, or any other medium which can be used to store or communicate the desired information and which can be accessed by the computer 320.

The communication media typically embodies computer-readable instructions, data structures, program modules, or other data in a modulated data signal, such as a carrier wave or other typical transport mechanism and includes any information delivery media. The term "modulated data signal" means a signal that has one or more of its characteristics set or changed in such a manner as to encode information in the signal. By way of example and not limitation, communication media includes wired media, such as a wired network or direct wired connection and wireless media, such as acoustic radio frequency, infrared or other wireless media. Combinations of any of the above should also be included within the scope of computer-readable media.

The system memory 324 includes computer storage media in the form of volatile and non-volatile memory, such as read only memory ("ROM") 328 and random access memory ("RAM") 330. A basic input/output system 332 ("BIOS") containing basic routines that help to transfer information between elements within the computer 320, such as during startup, is typically stored in ROM 328. RAM 330 typically contains data and/or program modules that are immediately accessible to and/or presently being operated on by the processing unit 322. By way of example, and not limitation, FIG. 1 illustrates an operating system 346, application programs 348, wizard engine 349 for processing dynamic wizards other program modules 350, and program data 352. The computer 320 may also include removable/non-removable and volatile/non-volatile computer storage media. By way of example only, FIG. 1 illustrates a hard disk drive 334 that reads from or writes to non-volatile magnetic media 336, a magnetic drive 338 that reads from or writes to a removable, non-volatile magnetic disk 340, and an optical drive 342 that reads from or writes to a removable, non-volatile optical disc 344, such as a CD-ROM or other optical media. Other removable/non-removable, volatile/non-volatile computer storage media that can be used in the exemplary operating environment include, but are not limited to, magnetic tape cassettes, flash memory cards, DVD's, digital video tapes, Bernoulli cap cartridges, solid state RAM, solid state ROM, and the like. The hard disk drive 334, magnetic disk drive 338 and optical disc drive 342 may be connected to the system bus 326 by a hard disk drive interface 354, a magnetic disk drive interface 356, and an optical drive interface 358, respectively. Alternatively, hard disk drive 334, magnetic disk drive 338, or optical disc drive 342 may be connected to the system bus 326 by a small computer system interface ("SCSI").

The drives and their associated computer storage media discussed above and illustrated in FIG. 3 provide storage of computer-readable instructions, data structures, program modules, and other data from the computer 320. In FIG. 3, for example, the hard disk drive 334 may also store the operating system 346, application programs 348, wizard engine 349, other programs 350, and program data 352. Note that these components can either be the same as or different from the operating system 346, the other program modules 350, and the program data 352. A user may enter commands and information into the computer 320 through an input device, such as keyboard 360 and/or a pointing device 362, commonly referred to as a mouse, trackball, or touch pad. Other input devices (not shown) may include a microphone, a joystick, a game pad, a satellite dish, a scanner, or the like. These and other input devices are often connected to the system bus 326 through user input interface 364 and may be connected by other interface and bus structures, such as a parallel port, serial port, game port, universal serial bus ("USB"), or other interface.

The computer 320 may operate in a network environment using logical connections to one or more remote computers 140. The remote computer 140 may be a personal computer, a server, a router, a network PC, a peer device, or other common network node and typically includes many or all the elements described above relative to the computer 320. The logical connections depicted in FIG. 3 include a LAN 120 and a WAN 130, but also include other networks. Such network environments are commonplace in office, enterprise-wide computer networks, intranets, and the Internet.

When used in a LAN network environment, the computer 320 is connected to the LAN 120 through a network interface 368. When using a WAN network environment, the computer typically includes a modem or other means for establishing communication over the WAN 130, including a network interface 368, over the WAN 130, such as the Internet 100. The modem 369, which may be internal or external, may be connected to the system bus 326 via the user input interface 364 or other appropriate mechanism. It will be appreciated that the network connections shown are exemplary, and that other means of establishing communications between computers may be used. Although many other internal components of the computer 320 are not shown, those of ordinary skill in the art will appreciate that such components and their interconnections are well known. Accordingly, additional details concerning the internal construction of the computer 320 need not be disclosed in connection with the present invention.

Those skilled in the art will understand that program modules, such as the operating system 346, the application programs 348, wizard engine 349, and the data 352 are provided to the computer 320 via one of its memory storage devices, which may include ROM 328, RAM 330, hard disk 334, magnetic disk drive 338, or optical disc drive 342. The hard disk drive 334 is used to store data 352 and programs, including the operating system 346 and application programs 348.

When the computer 320 is turned on or reset, the BIOS 332, which is stored in ROM, instructs the processing unit 322 to load the operating system 346 from the hard disk drive 334 into the RAM 330. Once the operating system 346 is loaded into RAM 330, the processing unit 322 executes the operating system code and causes the visual elements associated with the user interface of the operating system to be displayed on a monitor. When an application program 348 is opened by a user, the program code and relevant data are read from the hard disk drive 334 and stored in RAM 330.

Although an exemplary client device 300 has been described that generally conforms to a single conventional general purpose computing device, those of ordinary skill in the art will appreciate that a client device 300 may actually be a combination of computing devices or components coordinated to communicate with the XGL server 400 over a network.

Figure 4:
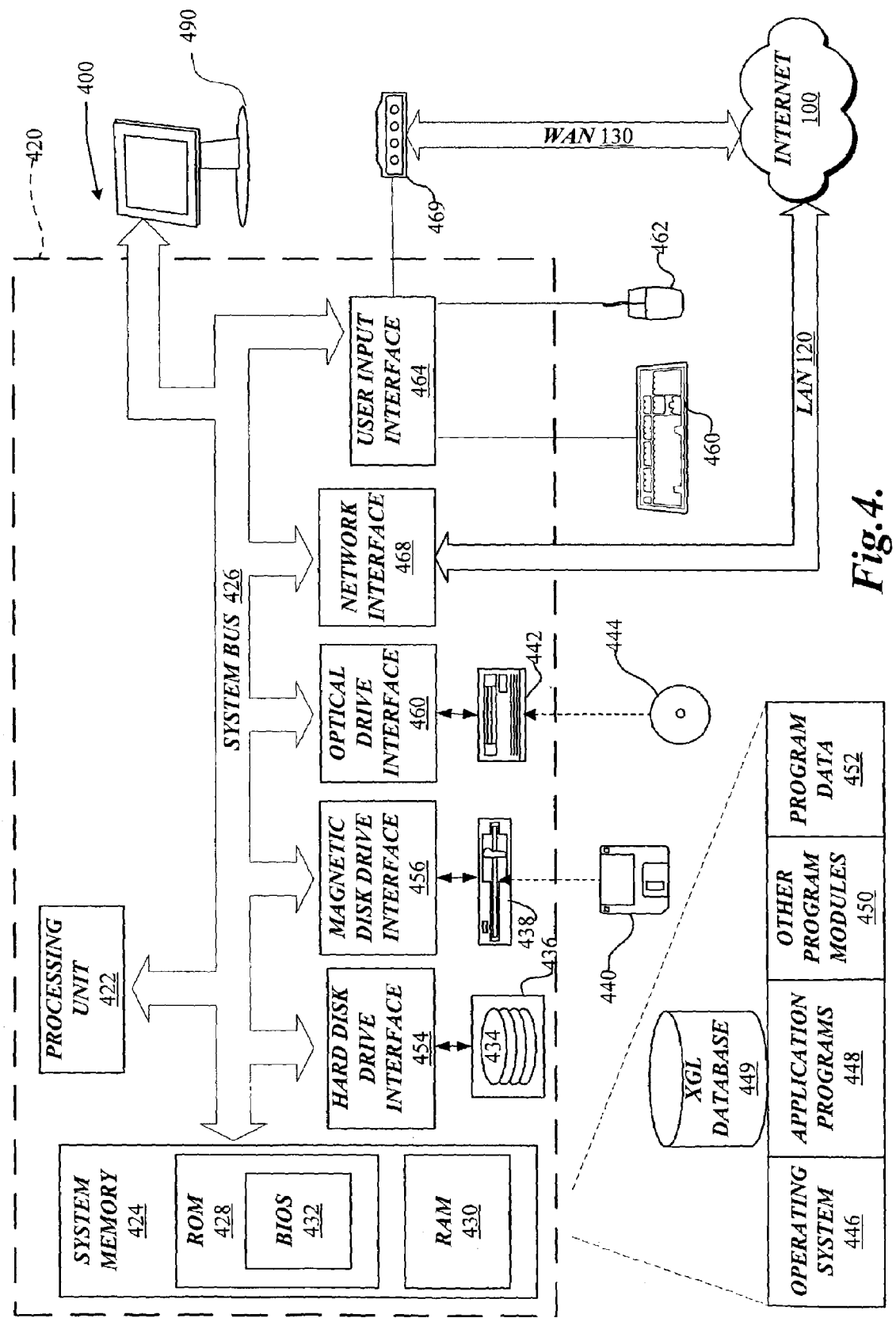
FIG. 4 is a block diagram of a computer that provides an exemplary server suitable for use in implementing the present invention.

With reference to FIG. 4, an exemplary server 400 suitable for implementing the invention is also a general purpose computing device in the form of a computer 420. Components of a computer 420 include, but are not limited to, a processing unit 422, system memory 424, a display 490, and a system bus 426 that couples various system components, including the system memory 424 to the processor 422. The system bus 425 may be any of several types of bus structures, including a memory bus or a memory controller, a peripheral bus, and a local bus using any of a variety of bus architectures. By way of example, not limitation, such architectures include an ISA bus, MCA bus, EISA bus, VESA local bus, PCI bus, also known as mezzanine bus, and AGP bus.

The computer 420 typically includes a variety of computer-readable media. Computer-readable media can be any available media that can be accessed by the computer 420 and include both volatile/non-volatile media and removable/non-removable media. By way of example, and not limitation, computer-readable media may comprise computer storage media and communication media. Computer storage media includes, but is not limited to, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store or communicate the desired information and which can be accessed by the computer 420.

The communication media typically embodies computer-readable instructions, data structures, program modules, or other data in a modulated data signal, such as a carrier wave or other typical transport mechanism and includes any information delivery media. The term "modulated data signal" means a signal that has one or more of its characteristics set or changed in such a manner to encode information in the signal. By way of example and not limitation, communication media includes wired media, such as a wired network or direct wired connection and wireless media, such as acoustic radio frequency, infrared, or other wireless media. Combinations of any of the above should also be included within the scope of computer-readable media.

The system memory 424 includes computer storage media in the form of volatile and non-volatile memory, such as ROM 428 and RAM 430. A BIOS 432 system 432 containing basic routines that help to transfer information between elements within the computer 420, such as during startup, is typically stored in ROM 428. RAM 430 typically contains data and/or program modules that are immediately accessible to and/or presently being operated on by the processing unit 422. By way of example and not limitation, FIG. 4 illustrates an operating system 446, application programs 448, other program modules 450, and program data 452. Also shown as residing in system memory 424 is an XGL database 449.

The computer 420 may also include removable/non-removable, volatile/non-volatile computer storage media. By way of example only, FIG. 4 illustrates a hard disk drive 434 that reads from or writes to non-removable, non-volatile magnetic media 436, a magnetic drive 438 that reads from or writes to a removable, non-volatile magnetic disk 440, and an optical drive 442 that reads from or writes to a removable, non-volatile optical disc 444, such as a CD-ROM or other optical media. Other removable/non-removable, volatile/non-volatile computer storage media that can be used in the exemplary operating environment include, but are not limited to, magnetic tape cassettes, flash memory cards, DVD's, digital video tapes, Bernoulli cap cartridges, solid state RAM, solid state ROM, and the like. The hard disk drive 434, magnetic disk drive 438, or optical disc drive 442 may be connected to the system bus 426 by a hard disk drive interface 454, a magnetic disk drive interface 456, or an optical drive interface 458, respectively. Alternatively, the hard disk drive 434, magnetic disk drive 438, or optical disc drive 442 may be connected to the system bus 426 by a SCSI connection.

The drives and their associated computer storage media discussed above and illustrated in FIG. 4 provide storage of computer-readable instructions, data structures, program modules, and other data from the computer 420. In FIG. 4, for example, the hard disk drive 434 may also store the operating system 446, application programs 448, other programs 450, program data 452, and XGL database 449. Note that these components can either be the same as or different from the operating system 446, the other program modules 450, and the program data 452. A user may enter commands and information into the computer 420 through an input device, such as keyboard 460 and/or a pointing device 462, commonly referred to as a mouse, trackball, or touch pad. Other input devices (not shown) may include a microphone, a joystick, a game pad, a satellite dish, a scanner, or the like. These and other input devices are often connected to the system bus 426 through user input interface 464 and may be connected by other interface and bus structures, such as a parallel port, serial port, game port, USB, or other interface.

The computer 420 may operate in a network environment using logical connections to one or more remote computers 140. The remote computer 140 may be a personal computer, a server, a router, a network PC, a peer device, or other common network node and typically includes many or all the elements described above relative to the computer 420. The logical connections depicted in FIG. 4 include a LAN 120 and a WAN 130, but also include other networks. Such network environments are commonplace in office, enterprise-wide computer networks, intranets, and the Internet 100.

When used in a LAN network environment, the computer 420 is connected to the LAN 120 through a network interface 468. When using a WAN network environment, the computer typically includes a modem or other means for establishing communication over the WAN 130, including a network interface 468, over the WAN 130, such as the Internet 100. The modem 469, which may be internal or external, may be connected to the system bus 426 via the user input interface 464 or other appropriate mechanism. It will be appreciated that the network connections shown are exemplary, and that other means of establishing communications between computers may be used. Although many other internal components of the computer 420 are not shown, those of ordinary skill in the art will appreciate that such components and their interconnections are well known. Accordingly, additional details concerning the internal construction of the computer 420 need not be disclosed in connection with the present invention.

Those skilled in the art will understand that program modules, such as the operating system 446, the application programs 448 and the data 452 are provided to the computer 420 via one of its memory storage devices, which may include ROM 428, RAM 430, hard disk 434, magnetic disk drive 438, or optical disc drive 442. The hard disk drive 434 is used to store data 452 and programs, including the operating system 446 and application programs 448.

When the computer 420 is turned on or reset, the BIOS 432, which is stored in ROM, instructs the processing unit 422 to load the operating system 446 from the hard disk drive 434 into the RAM 430. Once the operating system 446 is loaded into RAM 430, the processing unit 422 executes the operating system code and causes the visual elements associated with the user interface of the operating system to be displayed on a monitor. When an application program 448 is opened by a user, the program code and relevant data are read from the hard disk drive 434 and stored in RAM 430.

Although an exemplary XGL server 400 has been described that generally conforms to a single conventional general purpose computing device, those of ordinary skill in the art will appreciate that an XGL server 400 may be a combination of computing devices or components coordinated to communicate with the client device 300 over a network.

Figure 5:
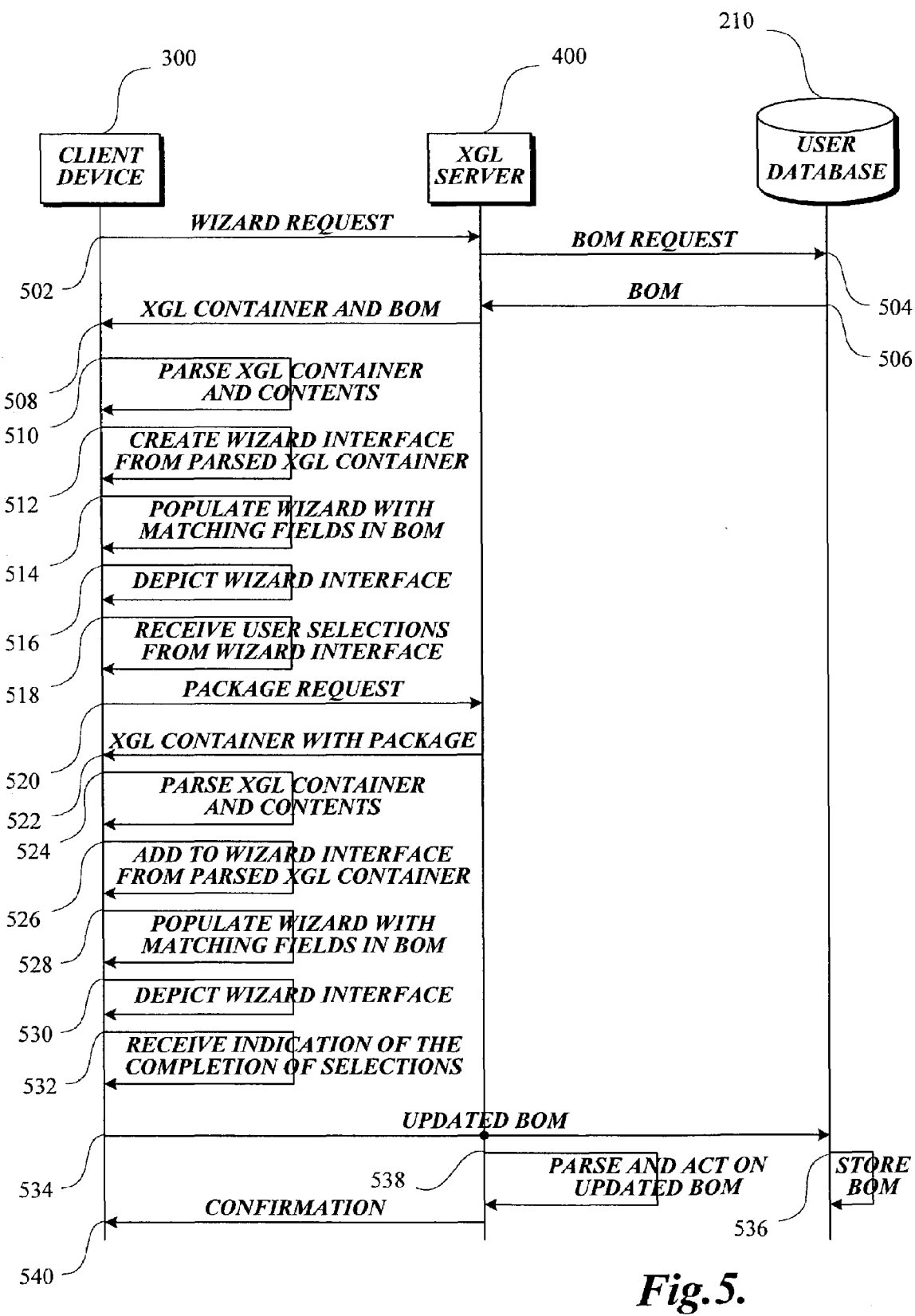
FIG. 5 is a diagram illustrating the actions taken by a client device, XGL server and a user database to provide a wizard interface to a client device in accordance with the present invention.

To illustrate the operation of a dynamic wizard interface formed in accordance with this invention, FIG. 5 illustrates one sequence of interactions between the devices of the system 200 shown in FIG. 2. The devices of system 200 illustrated in FIG. 5 include the client device 300, the XGL server 400, and the user database 210. The interactions of, and the routines performed by, the various devices are illustrated and described in greater detail with reference to FIGS. 6, and 9–17.

Returning to FIG. 5, dynamic wizard provision and interpretation is initiated when a client device 300 sends a wizard request 502 to the XGL server 400. After the XGL server 400 receives the wizard request 502, the XGL server requests any relevant bill of materials ("BOM") 504 contained in the user database 210. The bill of materials is data stored locally or on a remote device that may be used to complete fields in a wizard interface. In some embodiments the stored data is user specific. The BOM data structure is such that the names of fields in the wizard interface and in the BOM data structure have a correspondence.

Assuming that there is information in the user database 210, the BOM 506 is returned to the XGL server 400. Accordingly, the XGL server returns an XGL container describing the initial packages of the wizard along with the BOM 508 to the client device 300. The client device 300 utilizing the wizard engine 349 then parses 510 the XGL container and its contents. Next the client device creates a wizard interface from the parsed XGL container, after which the wizard interface is populated 514 with any matching fields in the BOM. The wizard interface is then depicted 516 on the client device 300. Any user selections are received 518. If the user selections require an additional package, such as from a branching request, a new package request is sent 520 to the XGL server 400. In response, the XGL server 400 returns an XGL container with the requested package 522 to the client device 300. Again, the XGL container and contents are parsed 524 and the wizard interface is updated 526 with the additional parsed information. Next if any of the additional information in the wizard matches fields in the BOM, the wizard is populated 528 with the matching fields. Then, the updated wizard interface is depicted 530 on the client device 300. When the end user completes their interaction with the wizard, the end user indicates completion 532. Thereafter, the client device 300 sends any additional information in an updated BOM 534 via the XGL server 400 to the user database 210, where the updated BOM is stored 536. Meanwhile, the XGL server 400 parses the updated BOM and acts on any information that requires action. For example, if the user signs up for an account, the XGL server 400 might check all the account information received from the user and, once validated, provide a confirmation 540 back to the client device 300.

It will be appreciated by those of ordinary skill in the art that FIG. 5 represents one exemplary set of interactions between the devices of system 200. It also will be appreciated, therefore, that additional package requests and/or caching of package requests may be included in such interactions. Still further, assuming that any of the packages retrieved contain live data, there may be additional communication with one or more devices (not shown) for providing such information to be displayed in the live data. Still further, it will be appreciated by those of ordinary skill in the art that the actions illustrated in FIG. 5 may be performed in other orders or may be combined. For example, parsing XGL containers and contents may be combined with populating a wizard and matching fields.

Figure 6:
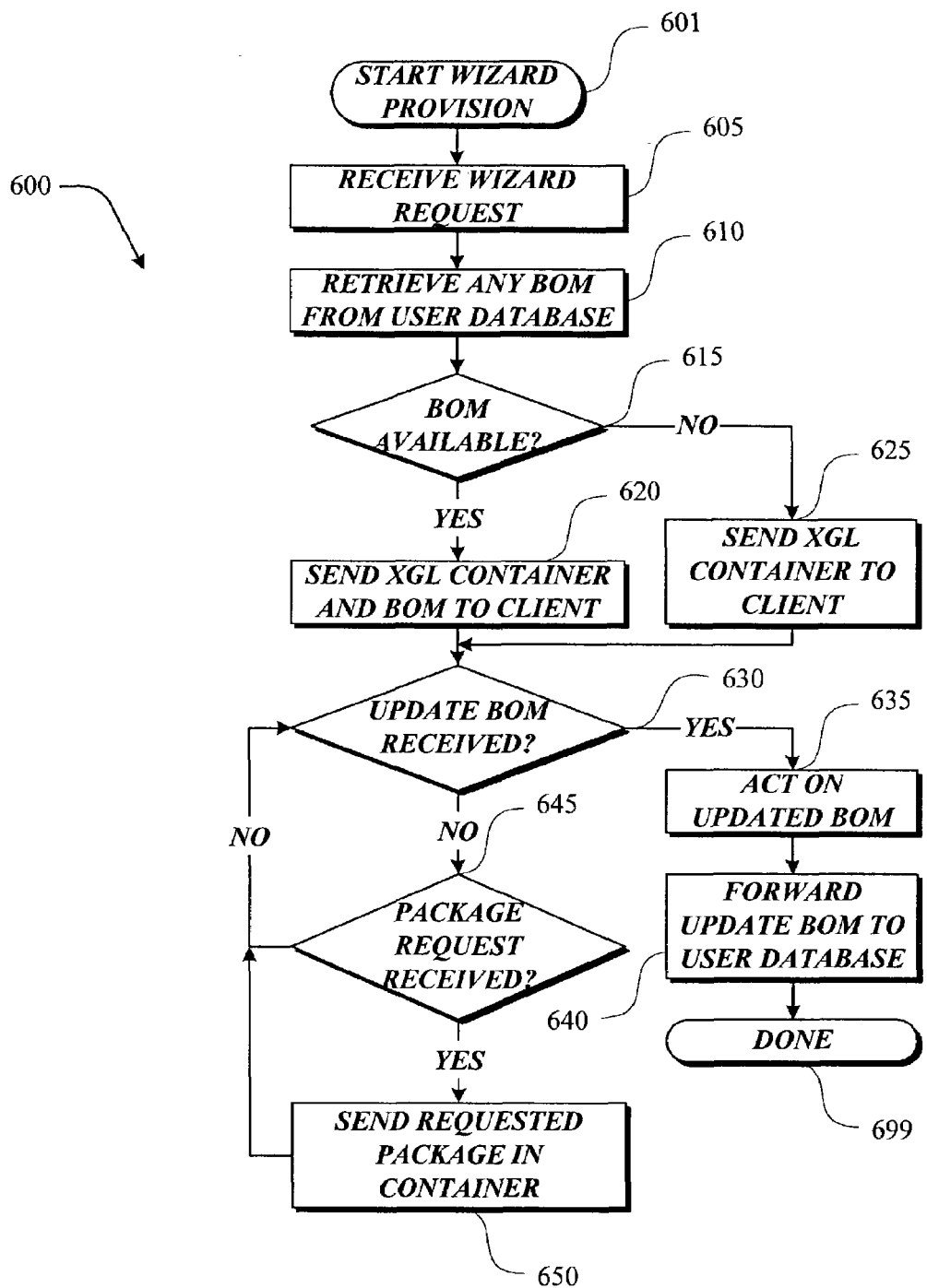
FIG. 6 is an overview flow diagram illustrating a wizard provision routine implemented by the server to provide a client device with a wizard interface in accordance with the present invention.

As illustrated in FIGS. 2, 4, and 5, the embodiment of the dynamic wizard system 200 described herein includes an XGL server 400 that is used to provide the containers and packages that describe the wizard interface as requested by a client device 300. A flowchart illustrating a wizard provision routine 600 implemented by the server 400, in accordance with one embodiment of the present invention, is shown in FIG. 6. The wizard provision routine 600 begins in block 601 and proceeds to block 605, where a wizard request is received from the client device 300. Next, in block 610, any BOM information is retrieved from the user database 210. Then, in decision block 615, a determination is made whether any BOM information was available. If the BOM information was available, an XGL container containing the initial packages for the wizard interface and the BOM are sent to the client in block 620. Otherwise, if no BOM was available, as determined in decision block 615, the XGL server 400 only sends the XGL container to the client in block 625. The XGL server 400 then waits for its next communication from the client device 300, namely units for the receipt of an update BOM, as shown by decision block 630. If in decision block 630 it is determined that an updated BOM has been received, routine 600 proceeds to block 635 where the XGL server 400 acts on the updated BOM. Then, the updated BOM is forwarded to user database 210 as shown by block 640. Routine 600 then ends at block 699. However, if in decision block 630 it is determined than an updated BOM has not been received and thereby ending routine 600 in the manner described above, a determination is made in decision block 645 whether a new package request was received. If not, processing loops back to decision block 630, otherwise, processing proceeds to block 650 where the requested package is sent in a container back to the client device 300. The routine 600 loops back to decision block 630.

As will be appreciated by those of ordinary skill in the art and others, the wizard provision routine 600 illustrates communications between a single client device and the XGL server 400. It should be understood that in many environments routine 600 will be occurring in multiple threads or processes on the XGL server 400 with a multitude of client devices 300.

Figure 7:
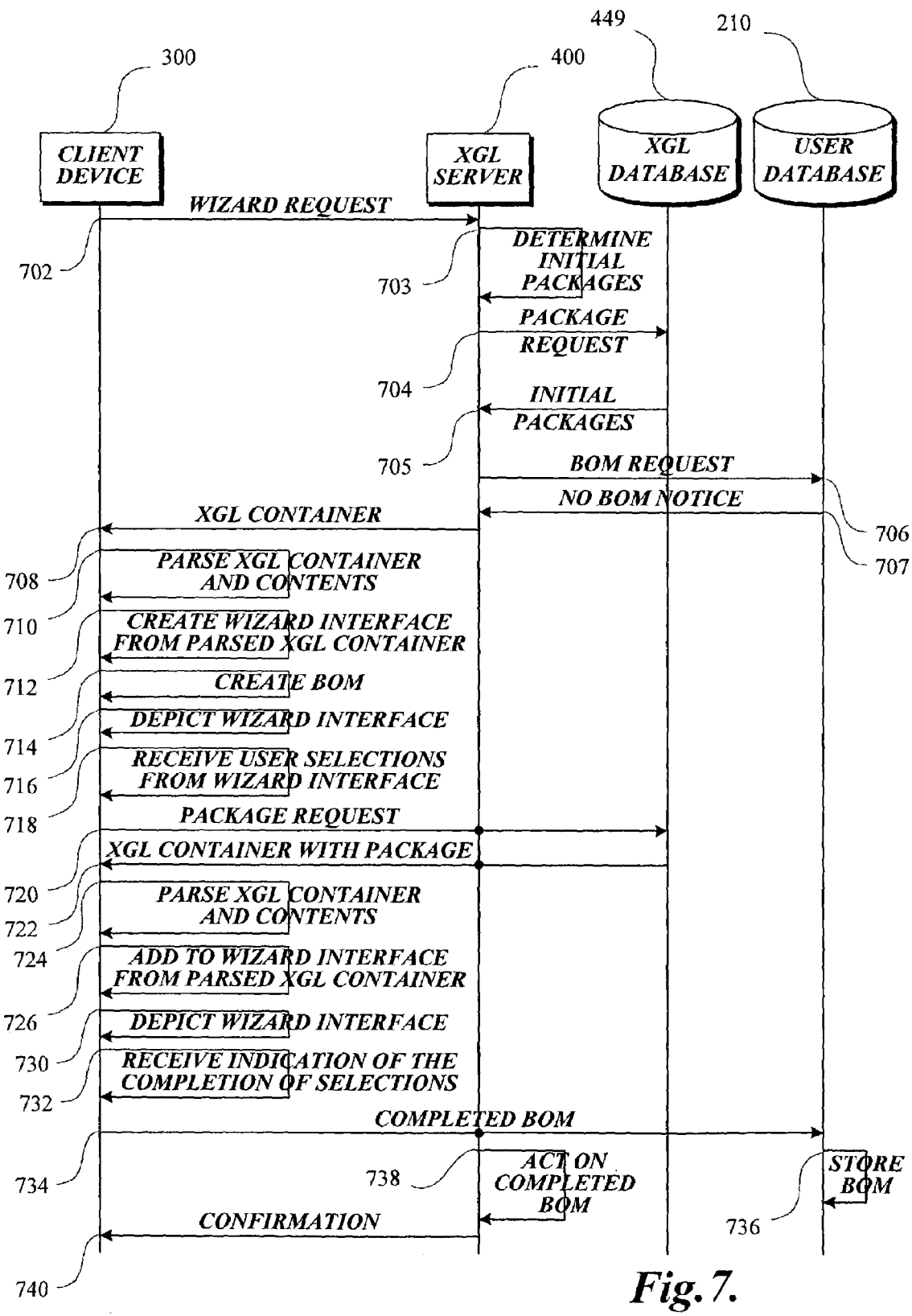
FIG. 7 is a diagram illustrating the actions taken by a client device an XGL server and XGL database and a user database to provide a dynamic wizard interface to a client device in accordance with the present invention.

To further illustrate the operation of a dynamic wizard interface formed in accordance with this invention, FIG. 7 illustrates another sequence of interactions between the devices of the system 200 shown in FIG. 2. The devices of system 200 illustrated in FIG. 7 include the client device 300, the XGL server 400, the XGL database 449 and the user database 210. The interactions of, and the routines performed by, the various devices are illustrated and described in greater detail with reference to FIGS. 8, and 9–17.

Returning to FIG. 7, dynamic wizard provision and interpretation is initiated when a client device 300 sends a wizard request 702 to the XGL server 400. After the XGL server 400 receives the wizard request 702, the XGL server determines 703 which packages are to be included as the initial packages in a wizard container. The XGL server 400 then requests 704 the packages from the XGL database 449 that returns 705 the requested initial packages. Then the XGL server requests 706 any BOM information from the user database 210. Assuming that there is no relevant information in the user database 210, the lack of BOM interaction 707 is returned to the XGL server 400. Accordingly, the XGL server returns an XGL container describing the initial packages of the wizard 708 to the client device 300.

The client device 300 then parses 710 the XGL container and its contents. Next, the client device creates 712 a wizard interface from the parsed XGL container. After which a new BOM is created 714. The wizard interface is then depicted 716 on the client device 300. Next, any user selections are received 718. If the user selections require an additional package, such as from a branch request, a new package request is sent 720 to the XGL server 400. In response, the XGL server 400 returns an XGL container with the requested package 722 to the client device 300. Again, the XGL container and contents are parsed 724 and the wizard interface is updated 726 with the additional parsed information. Then, the updated wizard interface is depicted 730 on the client device 300. When the end user completes their interaction with the wizard, the end user indicates this completion 732. Thereafter, the client device 300 sends any additional information in an updated BOM 734 via the XGL server 400 to the user database 210, where the updated BOM is then stored 736. Meanwhile the XGL server 400 parses the updated BOM and acts on any information that requires action. For example, if the user signs up for an account, the XGL server 400 might check all the account information received from the user and, once validated, provide a confirmation 740 back to the client device 300.

It will be appreciated by those of ordinary skill in the art that FIG. 7 represents one exemplary set of interactions between the devices of system 200. It also will be appreciated, therefore, that additional package requests and/or caching of package requests may be included in such interactions. Still further, assuming that any of the packages retrieved contain live data, there may be additional communication with one or more devices (not shown) for providing such information to be displayed in the live data. Additionally, it will be appreciated by those of ordinary skill in the art that the actions illustrated in FIG. 7 may be performed in other orders or may be combined. For example, creating a wizard interface may be combined with creating a BOM.

Figure 8:
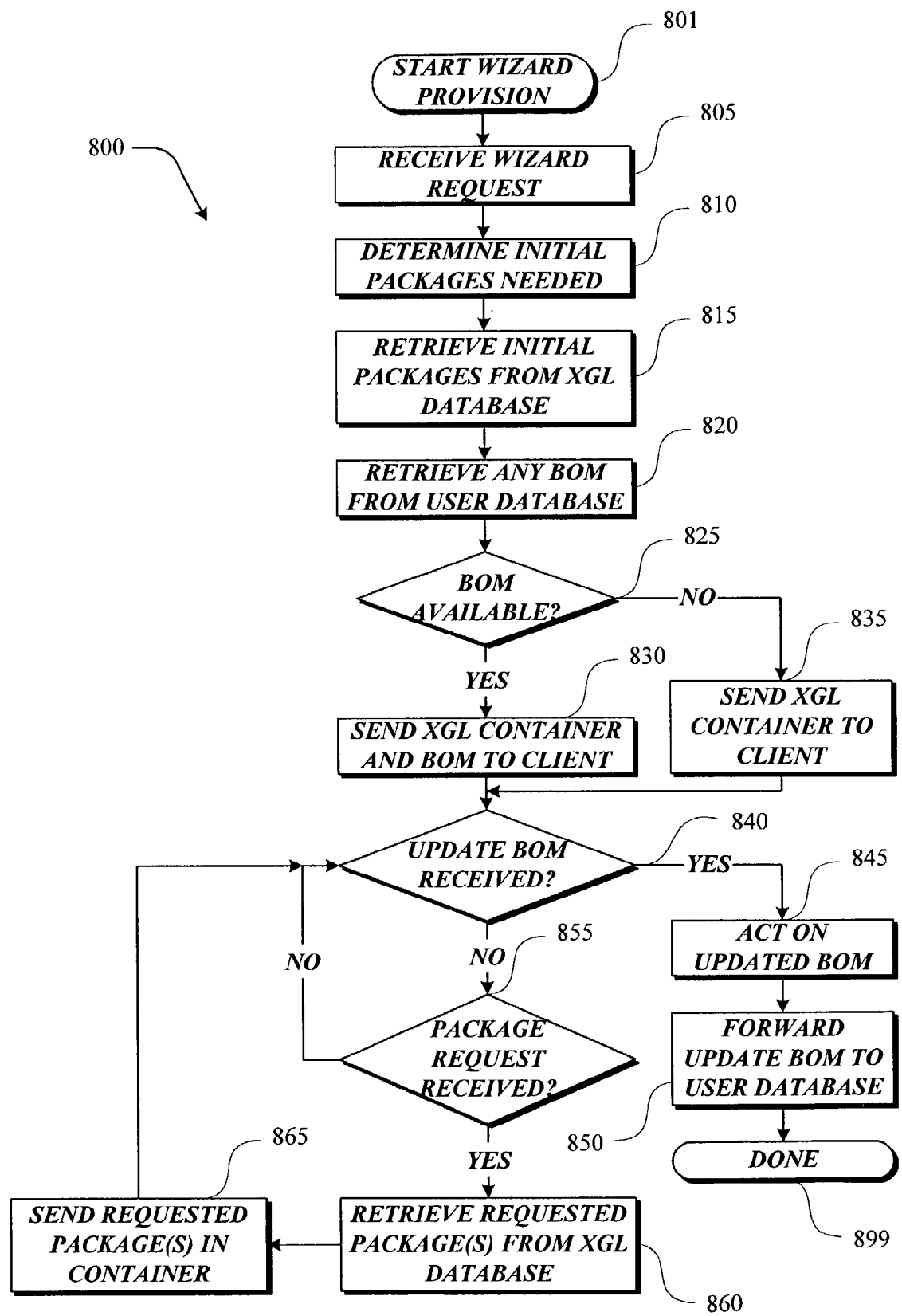
FIG. 8 is an overview flow diagram illustrating a wizard provision routine implemented by the XGL server to provide a wizard to a client device in accordance with the present invention.

As illustrated in FIGS. 2, 4, and 5, the embodiment of the dynamic wizard system 200 described herein includes an XGL server 400 that is used to provide the containers and packages that describe the wizard interface as requested by a client device 300. A flowchart illustrating an alternate wizard provision routine 800 implemented by the XGL server 400, in accordance with one alternate embodiment of the present invention, is shown in FIG. 8. The wizard provision routine 800 begins in block 801 and proceeds to block 805, where a wizard request is received from the client device 300. Then in block 810 an initial set of packages is determined. In one embodiment this is a set of all the non-branching packages that form the initial part of a wizard interface. These initial packages are then retrieved from an XGL database 449 in block 815. Next, in block 820, any BOM information is retrieved from the user database 210. Then, in decision block 825, a determination is made whether any BOM information was available. If the BOM information was available, then an XGL container containing the initial packages for the wizard interface and the BOM are sent to the client in block 830. Otherwise if no BOM was available as determined in decision block 825, then the XGL server 400 only sends the XGL container to the client in block 835. The XGL server 400 then waits for its next communication from the client device 300. If in decision block 840 it was determined that an updated BOM was received, then routine 800 proceeds to block 845 where the XGL server 400 may then act on the updated BOM and the updated BOM is forwarded to user database 210 in block 850. Routine 800 then ends at block 899. However, if in decision block 840 it was determined than an updated BOM was not received (e.g., ending routine 800), then a determination is made in decision block 855 whether a new package (or packages) request was received. If not, then processing loops back to decision block 840, otherwise, processing proceeds to block 860 where the requested packages are retrieved from XGL database 499. Next, the packages are sent in a container back to the client device 300 and routine 800 continues at decision block 840.

As will be appreciated by those of ordinary skill in the art and others, the wizard provision routine 800 illustrates communications between a single client device and the XGL server 400. It should be understood that in many environments routine 800 will be occurring in multiple threads or processes on the XGL server 400 with a multitude of client devices 300.

Figure 9:
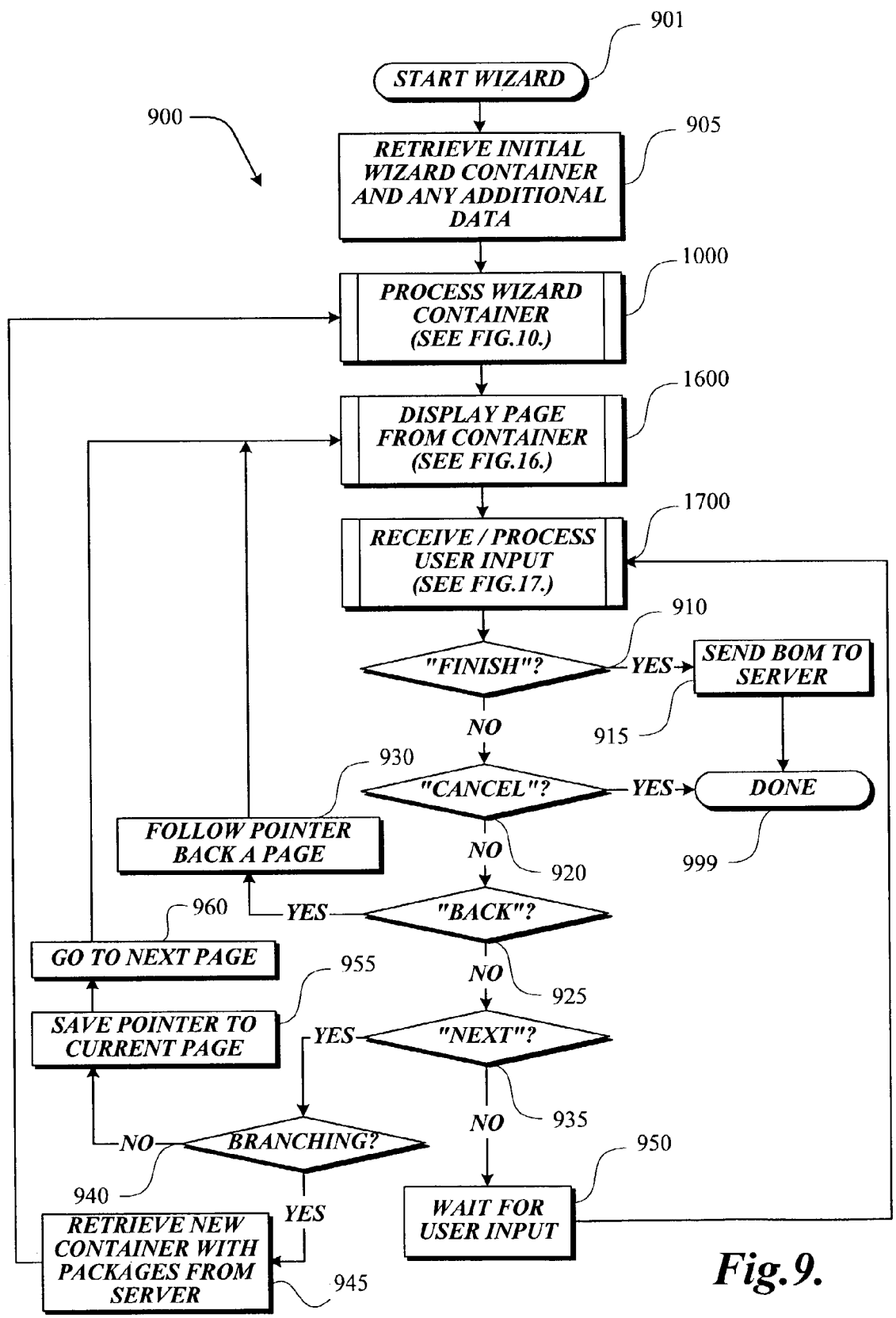
FIG. 9 is an overview flow diagram illustrating a wizard interface routine implemented by a client device to provide a wizard interface to an end user in accordance with the present invention.

FIG. 9 illustrates a wizard routine 900 implemented on a client device 300, as part of a wizard engine 349. Wizard routine 900 starts at block 901 and proceeds to block 905, where the client device 300 receives the initial wizard container and any additional data such as BOM data. Next, in subroutine block 1000, the wizard container is processed. Subroutine 1000 is described in greater detail below with regard to FIG. 10. Next, the flow continues to subroutine block 1600, where a page is displayed from the container. Again, subroutine block 1600 is described with greater detail below with regard to FIG. 16. After the page display, subroutine block 1700 receives and processes any user input. Subroutine 1700 is described in greater detail below with regard to FIG. 17. Once the user input has been received and/or processed, flow continues to decision block 910, where a determination is made whether a finish signal has been received. If so, processing continues to block 915, where the final BOM is sent to the XGL server 400. Routine 900 then ends at block 999.

If in decision block 910 it was determined that a finish signal was not received, processing continues to decision block 920, where a determination is made whether a cancel signal was received. If a cancel signal was received, processing ends at block 999. Note, with a cancel signal, the BOM is not sent to the XGL server, as the end-user has not approved the input in the wizard.

If in decision block 920 it was determined that a cancel signal was not received, a determination is made in decision block 925 whether a back signal was received. If so, the logic continues to block 930 where the wizard follows a pointer back one page in the wizard flow. Processing then loops back to subroutine block 1600 where the prior page is again displayed.

If in decision block 925 it is determined that a back signal was not received, then, in decision block 935, a determination is made whether a next signal was received. If a next signal was received in decision block 935, the logic continues to decision block 940, where a determination is made whether the next signal initiated a branching instruction. As noted above, a branching instruction is when the current packages have a branch point where one or more other packages and/or pages are needed to continue the wizard flow.

If a branching instruction was indicated, in block 945, a new container with packages is retrieved from the XGL server 400 that meets the conditions requested in the branch. The new container is then processed by looping back to subroutine block 1000.

If in decision block 940 it was determined that the next signal did not initiate a branching instruction, in block 955 a pointer to the current page is saved, and the next page is retrieved (block 960). The process then loops back to subroutine block 1600 for displaying the next page. If, however, in decision block 935 no next signal was received, then, in block 950, routine 900 waits for more user input by looping back to subroutine block 1700.

While only conventional finish, cancel, back, and next choices or commands are described in FIG. 9 as included in routine 900, those of ordinary skill in the art will appreciate that other commands that may be included in a wizard interface. Thus, routine 900 should be taken as illustrative and not limiting.

Figure 10:
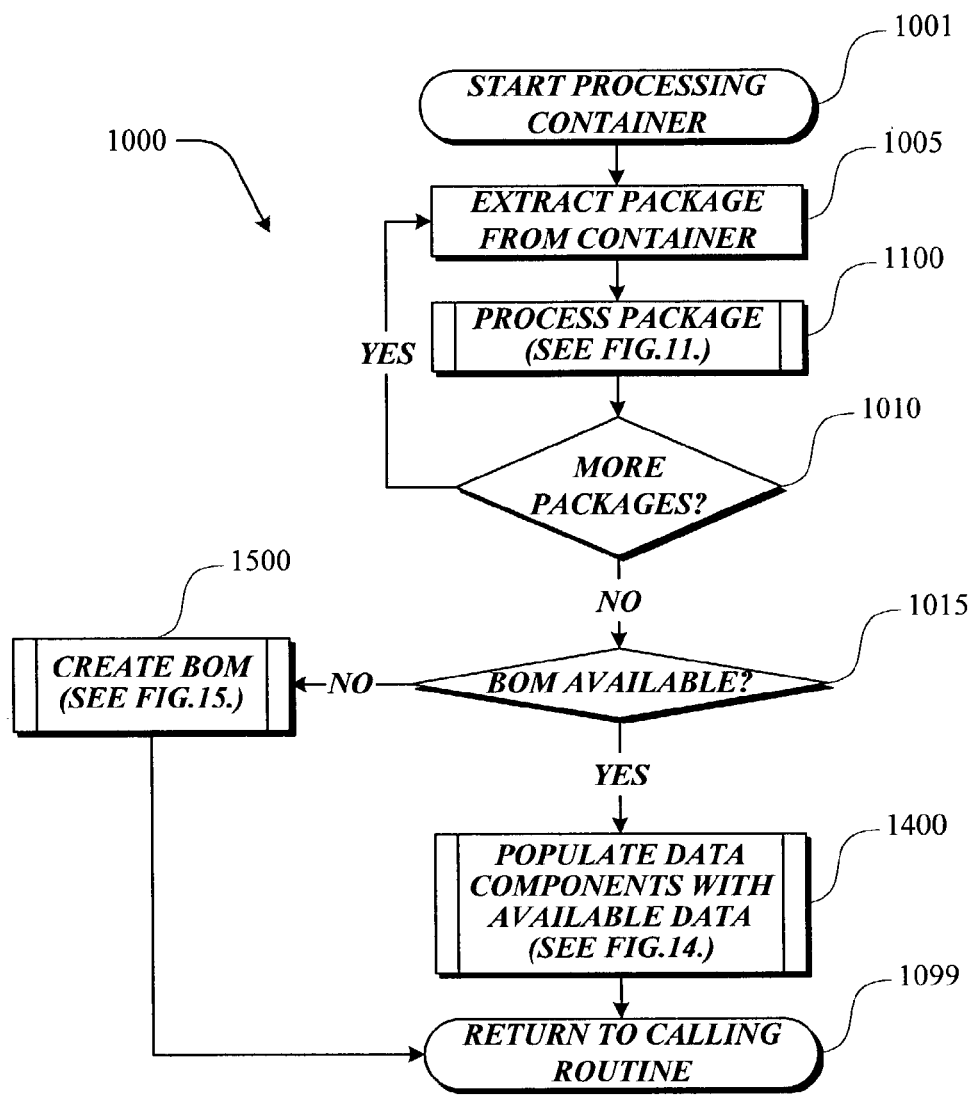
FIG. 10 is an overview flow diagram illustrating a container processing subroutine implemented by a client device in accordance with the present invention.

FIG. 10 illustrates the container processing subroutine 1000. Subroutine 1000 begins at block 1001 and proceeds to block 1005, where a package is extracted from the container. The extracted package is then processed in a package processing subroutine 1100, described in greater detail below with regard to FIG. 11. After processing, a new determination is made in decision block 1010 whether the container has more packages. If in decision block 1010 it is determined that the container contains more packages, processing loops back to block 1005, where another package is extracted from the container. Otherwise, if in decision block 1010 a determination is made that no further packages are contained in the container, then, in decision block 1015, a determination is made whether a BOM is available either accompanying the container, or as part of the container. If in decision block 1015 a determination was made that no BOM is available, a new BOM is created in subroutine block 1500 described in greater detail below with regard to FIG. 15. Processing then ends at block 1099. Otherwise, if in decision block 1015 a determination was made that a BOM is available, processing continues to subroutine block 1400, where the data components in the wizard with corresponding fields in the BOM are populated with this newly available data in subroutine block 1400, described in greater detail below with regard to FIG. 14. In any case, subroutine 1000 ends at block 1099 by returning to the routine that called it.

Figure 11:
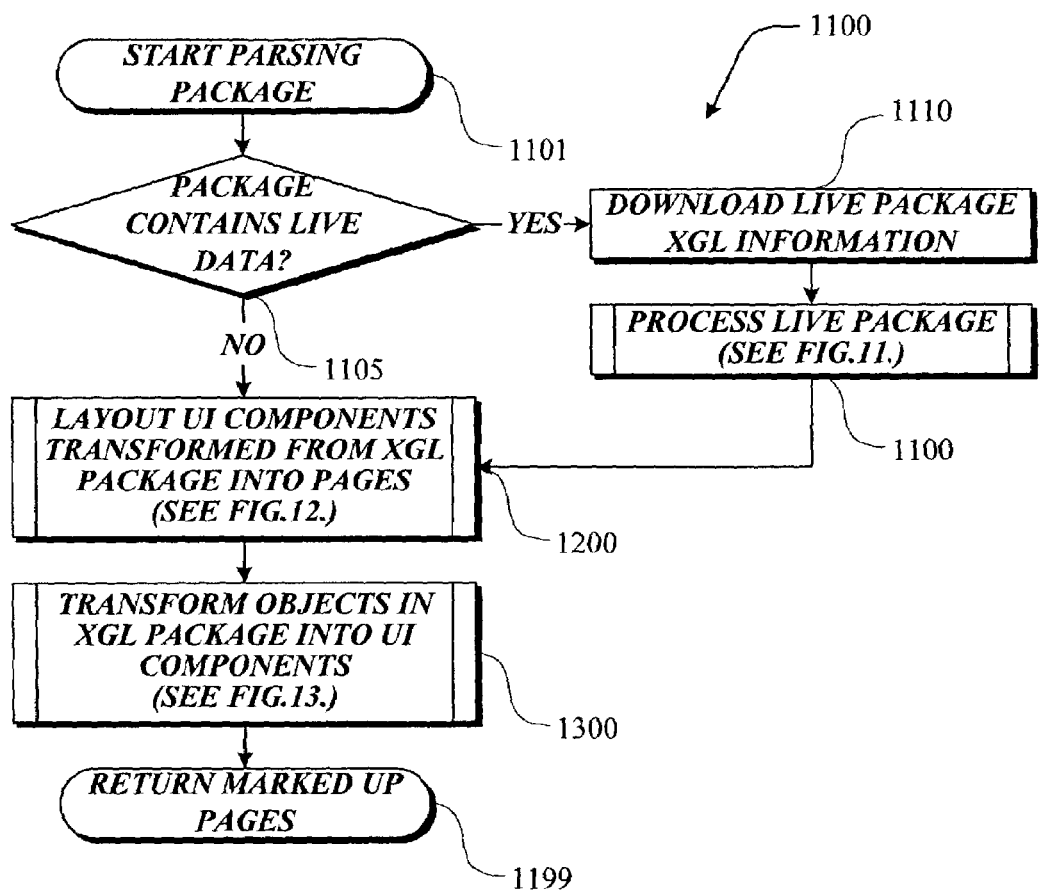
FIG. 11 is an overview flow diagram illustrating a package parsing subroutine implemented by a client device in accordance with the present invention.

FIG. 11 illustrates an exemplary package parsing subroutine 1100. Subroutine 1100 begins at block 1101 and proceeds to decision block 1105, where a determination is made whether a package contains live data. If in decision block 1105 it is determined that a package contains live data, processing continues to block 1110, where a live package of XGL information is downloaded from the XGL server 400. Next, subroutine 1100 is recursively called to process the live package. Processing then continues to subroutine block 1200. If in decision block 1105 a determination is made that the package does not contain live data, processing also continues to subroutine block 1200, where layout user interface components are transformed from the XGL package into one or more wizard pages. Subroutine 1200 is described in greater detail below with regard to FIG. 12. Once the layout of the user interface component has been transformed from the XGL, processing continues to subroutine 1300, where the objects in the XGL package are transformed into user interface components as laid out according to the layout components previously transformed in subroutine block 1200. Subroutine 1300 is described in greater detail below with regard to FIG. 13. The transformation of the layout and components together results in a set of marked up pages that are returned in block 1199 to the routine that called the package parsing subroutine 1100.

Figure 12:
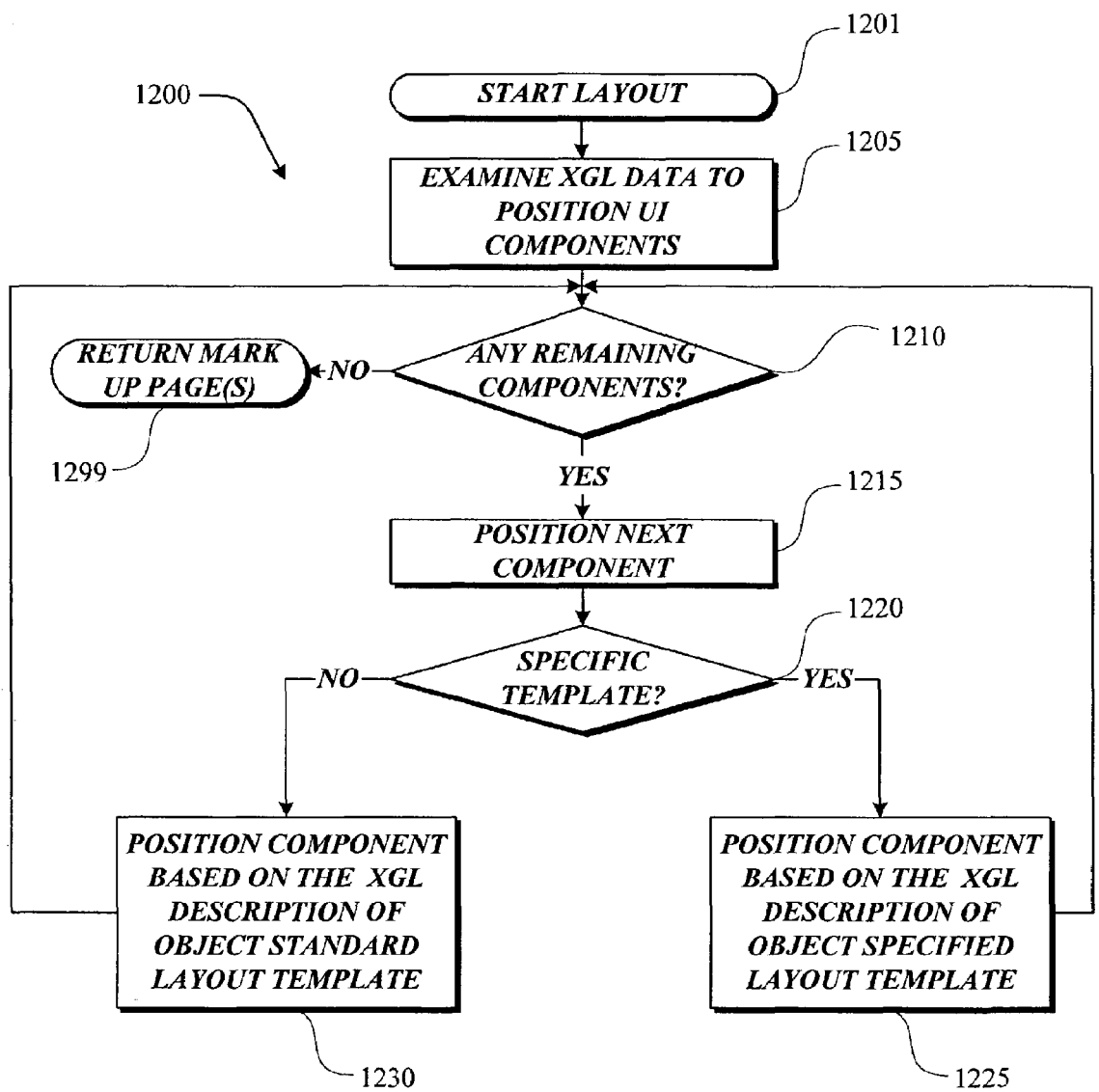
FIG. 12 is an overview flow diagram illustrating a layout subroutine implemented by a client device in accordance with the present invention.

FIG. 12 illustrates an exemplary layout transformation subroutine 1200. The layout transformation subroutine 1200 begins at block 1201 and proceeds to block 1205, where the XGL layout data is examined to position user interface components. Next, in decision block 1210 a test is made to see if any components still remain to be examined. If not, the layout marked up pages are returned in block 1299 to the routine that called subroutine 1200. If in decision block 1210 it is determined that more layout components remain, then, in block 1215 the next component is positioned. During positioning, a determination is made in decision block 1220 whether a specific template should be used for positioning the next component. If so, in block 1225 the position of the next component is based on the description of an object specified layout template. This may be used when a special layout is needed for a particular type of wizard and/or component in a wizard. Processing then loops back to decision block 1210. If in decision block 1220 a determination was made that no specific template is required, as shown in block 1230, the position of the component is based on an XGL description of a standard object layout template in accordance with a standard layout template used by the wizard engine on the client device 300. Again, processing loops back to decision block 1210, where a determination is made whether any components remain for layout.

Figure 13:
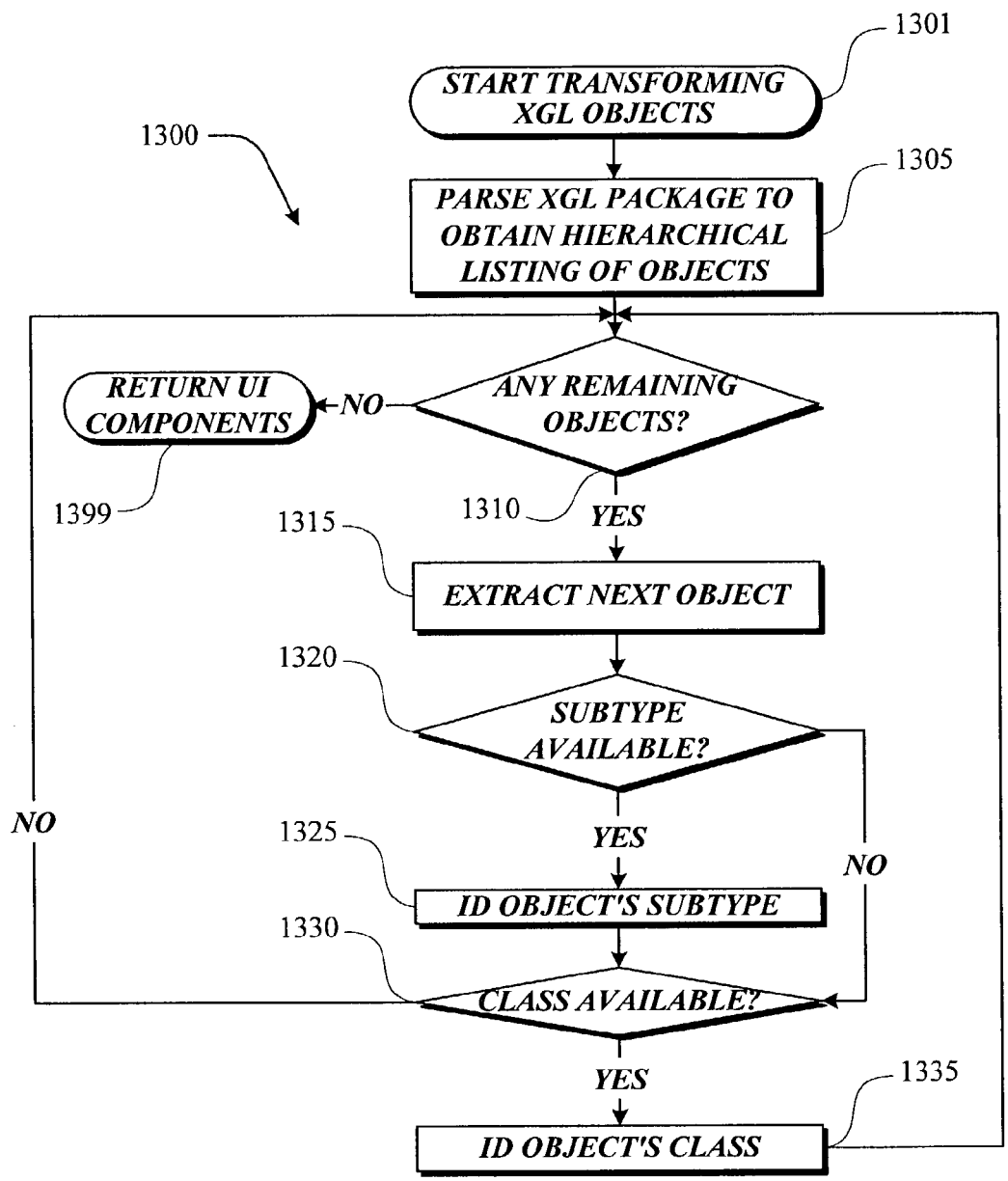
FIG. 13 is an overview flow diagram illustrating an object transformation subroutine implemented by a client device in accordance with the present invention.
Figure 14:
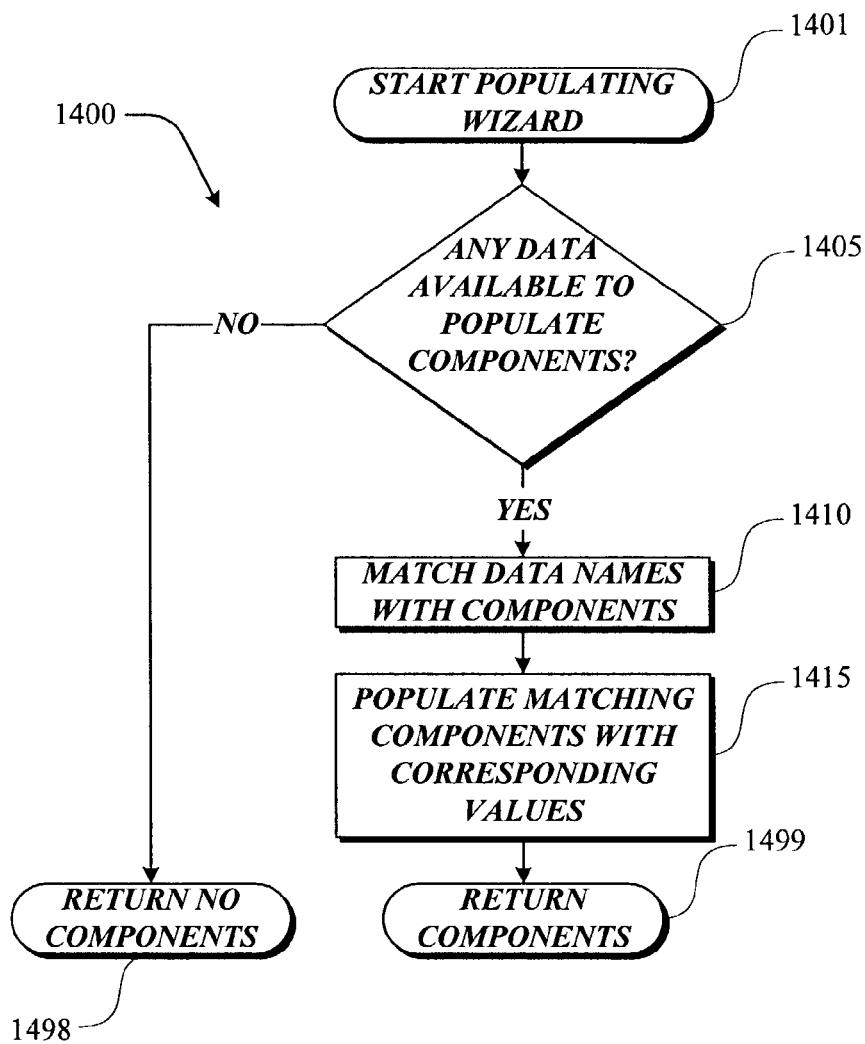
FIG. 14 is an overview flow diagram illustrating a data field populating subroutine implemented by a client device in accordance with the present invention.

FIG. 13 illustrates one exemplary embodiment of an XGL object transformation subroutine 1300. Subroutine 1300 begins in block 1301 and proceeds to block 1305, where an XGL package is parsed to obtain a hierarchical listing of objects. Next, in decision block 1310 a determination is made whether any objects remain in the list. If not, the subroutine 1300 returns any user interface components for the wizard in block 1399.

If in decision block 1310 it is found that objects still remain in the list, then in block 1315, the next object is extracted, i.e., removed from the list. Then, in decision block 1320, a test is made to determine if there is a subtype available for the extracted object. If a subtype is available, processing continues to block 1325, where the object's subtype is identified. If in decision block 1320 it was determined that no subtype is available, or after the object's subtype has been identified in block 1325, processing proceeds to decision block 1330, where a determination is made whether a class is available for the object. If a class is available, processing proceeds to block 1335, where the object's class is identified. After an object's class has been identified in block 1335, or if a class was found not to be available in decision block 1330, processing loops back up to decision block 1310, where a determination is made whether any objects remain on the list.

As noted above, FIG. 14 illustrates a wizard population subroutine for filling out data fields in a wizard from a BOM. Subroutine 1400 begins at block 1401 and proceeds to decision block 1405, where a determination is made whether any data is available to populate the components of the wizard. If not, processing proceeds to block 1495, which returns notice that no components are available to the calling routine. If, however, in decision block 1405 it was determined that there is data to populate components, then, in block 1410, the data names in the BOM and in the wizard are compared for matches. Next, in block 1415, the data portion of the wizard components which match the names in the BOM are populated with the values in the data fields of the BOM. These newly populated components are then returned in block 1499 to the calling routine.

Figure 15:
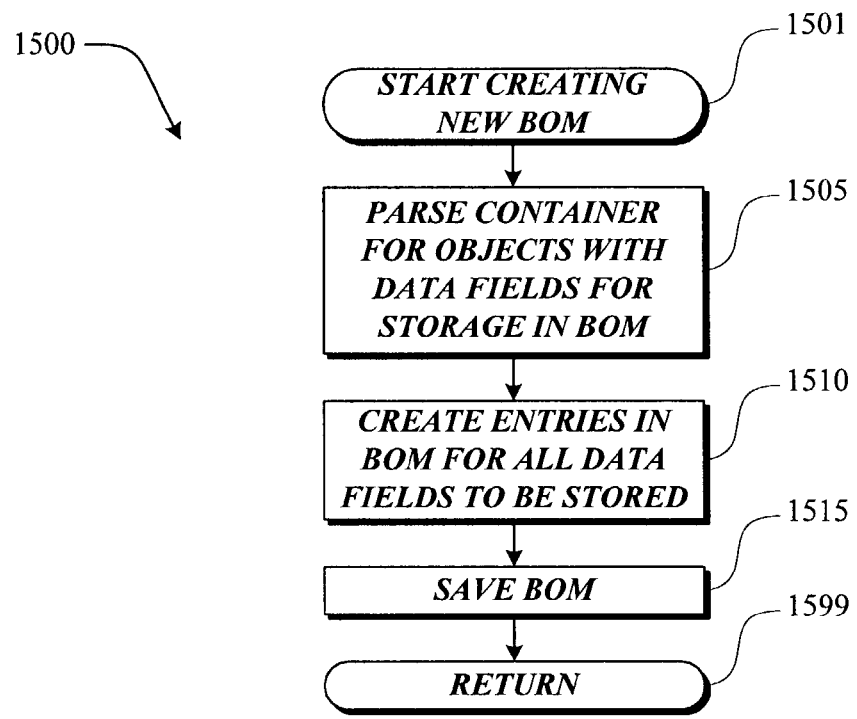
FIG. 15 is an overview flow diagram illustrating a bill of materials creation subroutine implemented by a client device in accordance with the present invention.

FIG. 15 illustrates a new BOM creation subroutine 1500. Subroutine 1500 begins at block 1501 and proceeds to block 1505, where the container or containers used to create the wizard are parsed for objects with data fields to be stored in the BOM. Next, at block 1510 entries are created in the BOM for all data fields to be stored. Then, at block 1515 the BOM is locally saved, and in block 1599 subroutine 1500 ends and returns to the routine that called it.

Figure 16:
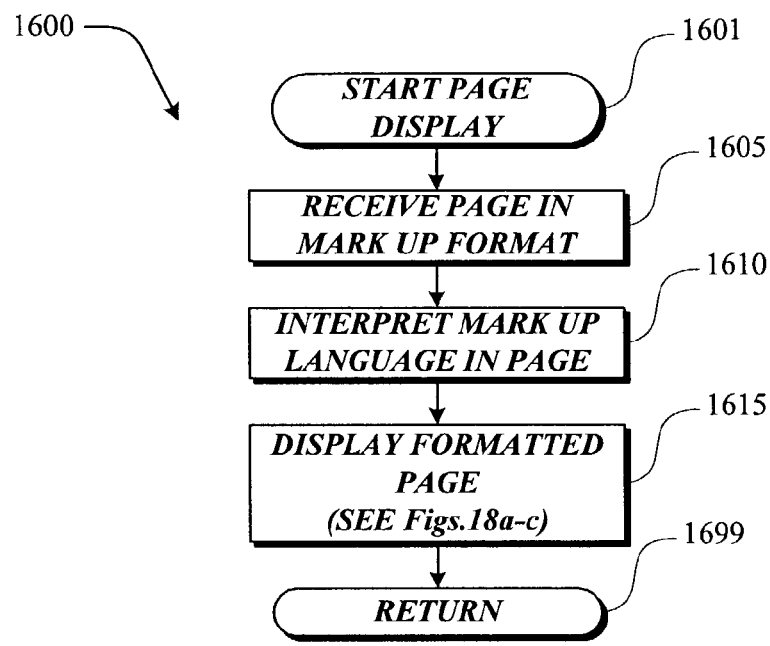
FIG. 16 is an overview flow diagram illustrating a wizard page display subroutine implemented by a client device in accordance with the present invention.

FIG. 16 illustrates a wizard page display subroutine 1600. Subroutine 1600 begins at block 1601 and proceeds to block 1605, where a page is received in a page markup format. Then, in block 1610, the markup language in the page is interpreted. Next, in block 1615 the formatted page is depicted on the client device 300. (FIGS. 18A–C and the following description illustrate and describe exemplary pages of a wizard interface.) Routine 1600 ends at block 1699 and returns to the routine that called it.

Figure 17:
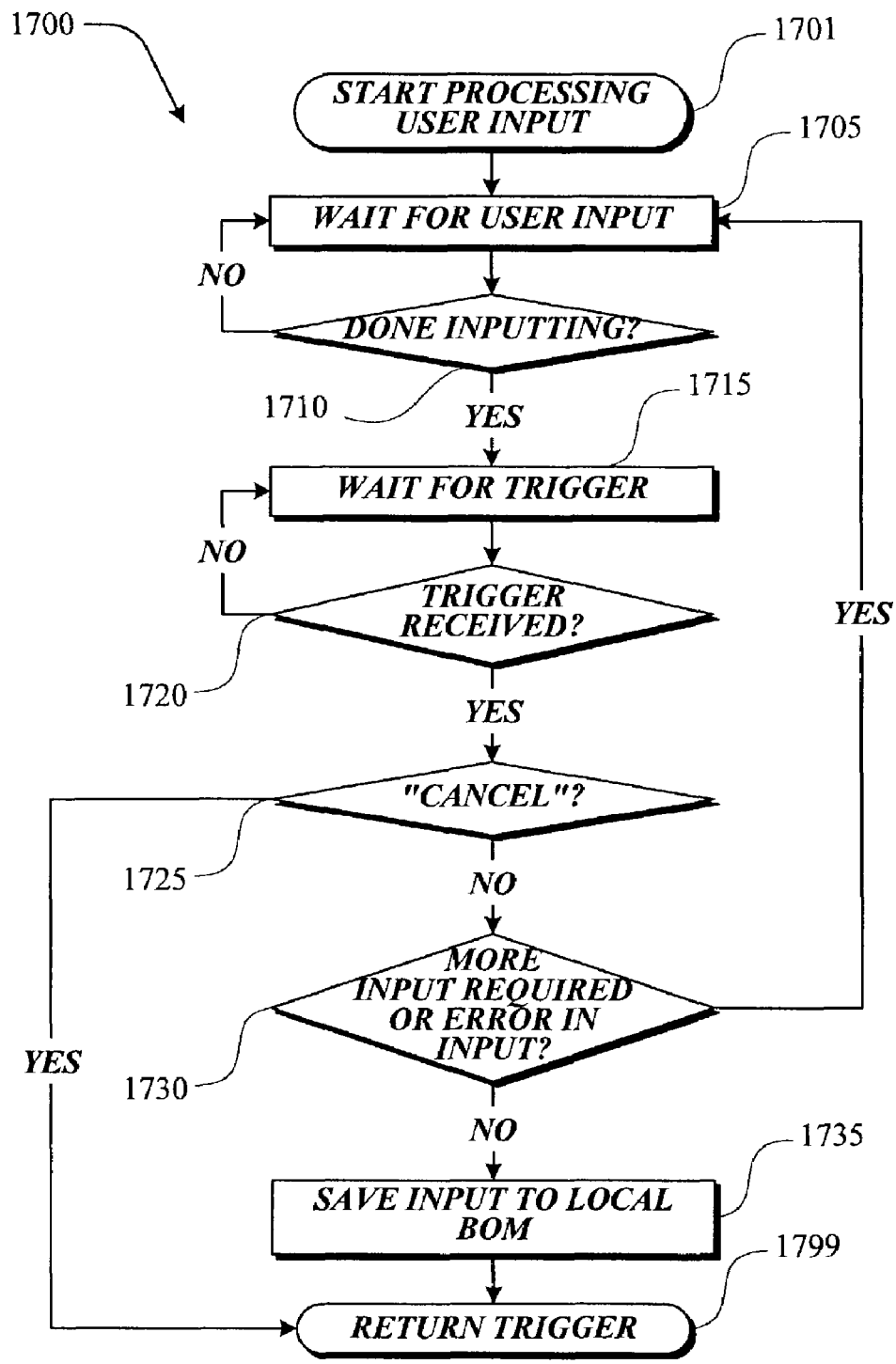
FIG. 17 is an overview flow diagram illustrating a subroutine for processing user input implemented by a client device in accordance with the present invention.

FIG. 17 illustrates a subroutine for processing user input. User input processing subroutine 1700 begins at block 1701 and proceeds to block 1705 where the subroutine waits for user input. Next, in decision block 1710, a determination is made whether the user has finished inputting information. If not, processing loops back to block 1705, where routine 1700 waits for further user input. If, however, in decision block 1710 a determination is made that the user is done inputting, then, in block 1715 subroutine 1700 waits for a trigger such as the user clicking or pushing one of the standard wizard buttons to switch pages. If in decision block 1720 a determination is made that a trigger was received, processing proceeds to decision block 1725. If, however, in decision block 1720 no trigger was found to have been received, processing loops back to block 1715, where routine 1700 waits for a trigger.

In decision block 1725, a determination is made whether the trigger that was received was a "cancel trigger." If so, processing proceeds to block 1799, where the trigger is returned to the calling routine. If, however, in decision block 1725 a determination is made that a cancel trigger was received, processing proceeds to decision block 1730, where a determination is made whether more input is required or whether there was an error in the user's input. If so, processing loops back to block 1705. If, however, no more input is required and there was no error in the user's input, processing proceeds to block 1735, where the input in the wizard page is saved to the local copy of the BOM. Processing then ends in block 1799, where the trigger that ended the processing is returned back to the calling routine.

As will be readily appreciated by those skilled in the art and others from the FIGS. 7–17 and the foregoing description, in one type of embodiment of the present invention, client devices 300 are able to retrieve dynamically created wizards that may be created and/or customized at retrieval time, such that the wizard interface is as up-to-date as the available package from which it will be formed.

Additionally, because preferably the dynamic wizard interface is built from XGL containers and packages, embodiments of the invention employing this aspect of the invention provide an efficient (in both storage and transmission) and easy to navigate user interface.

Figure 18A:
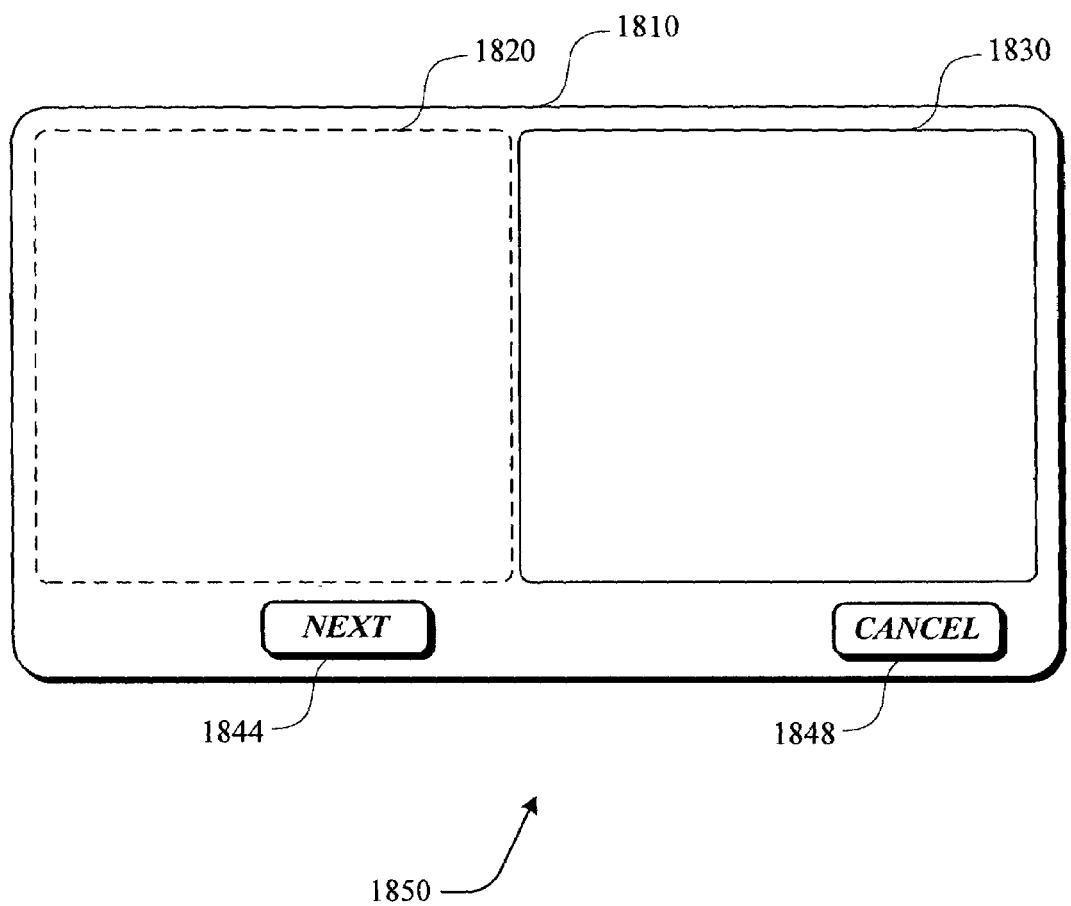
FIGS. 18A–18C show exemplary wizard interface pages in accordance with the present invention.
Figure 18B:
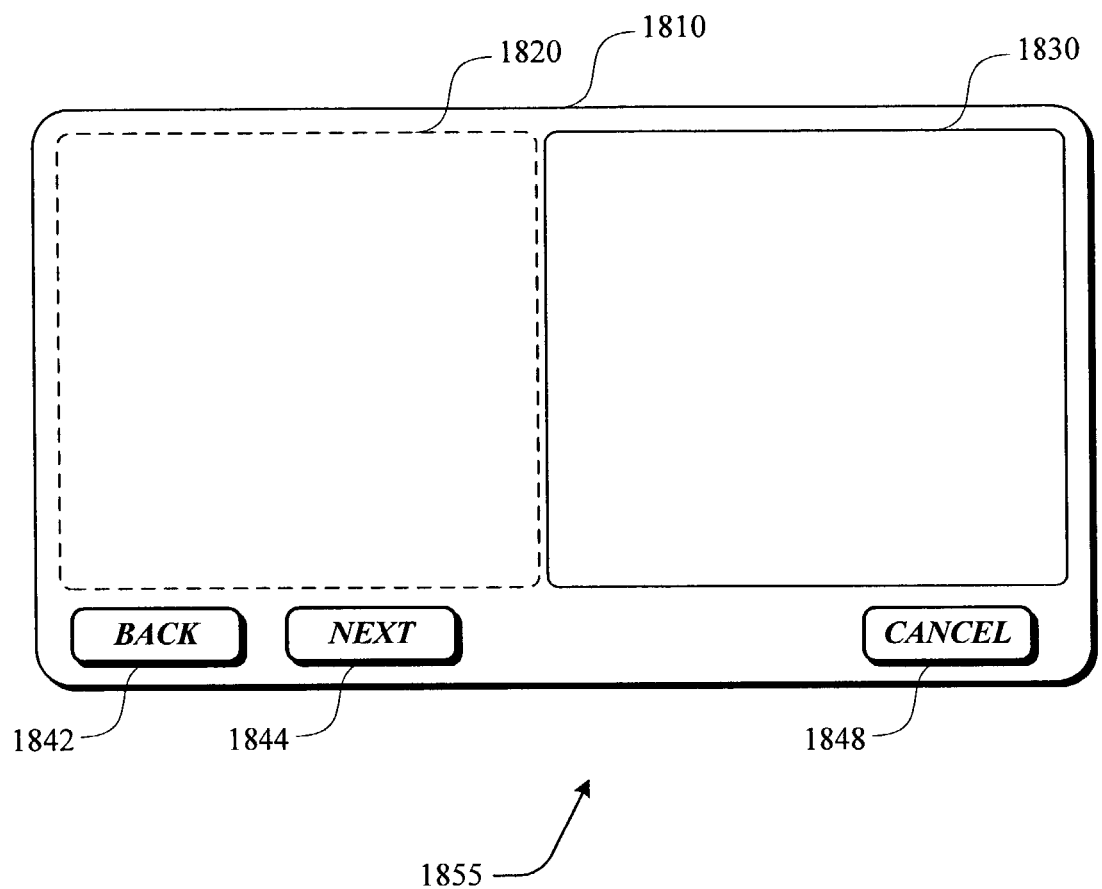
Figure 18C:
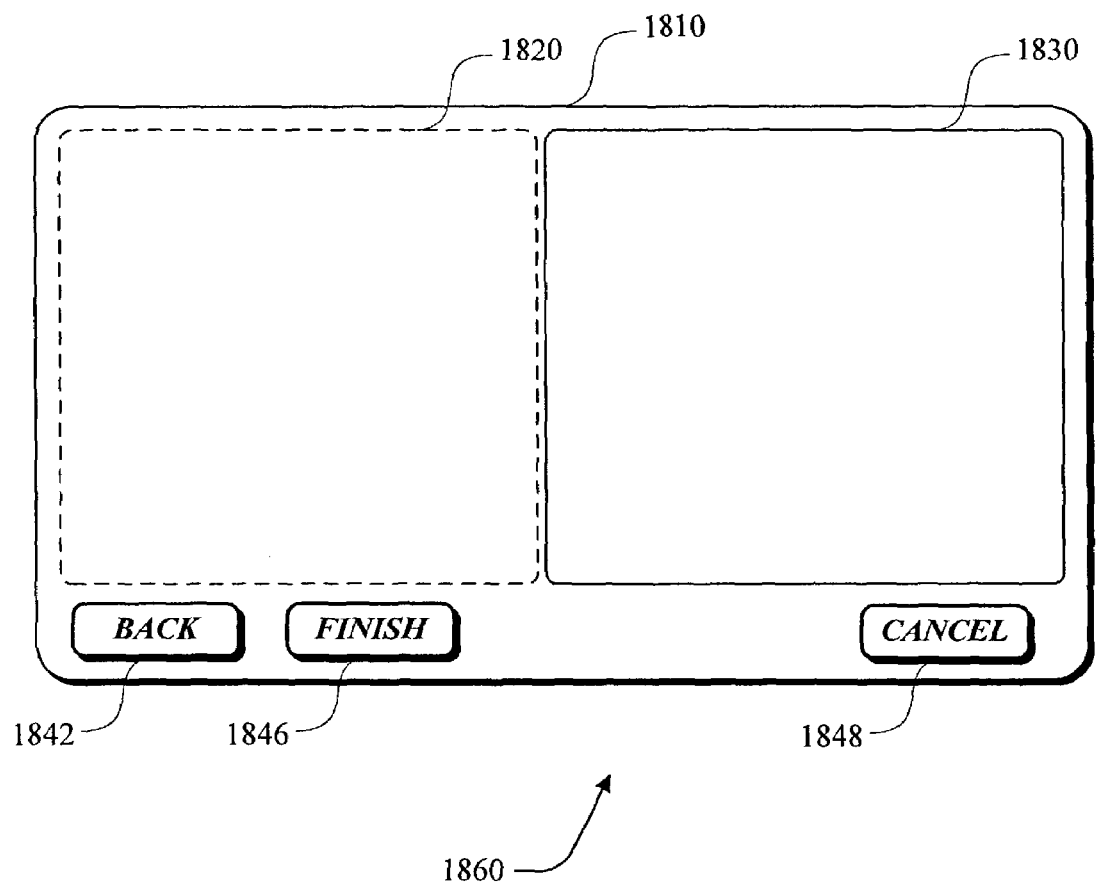

FIGS. 18A–C illustrate exemplary wizard interface pages created by an exemplary embodiment of the present invention. FIG. 18A shows an initial wizard page 1850 that includes only a next button 1844, a cancel button 1848, a left panel 1820, and a right panel 1830 located within the wizard page frame 1810. FIG. 18B shows an wizard page 1855. FIG. 18B is similar to FIG. 18A except that FIG. 18B also includes a back button 1842. FIG. 18C shows a final wizard page 1860. FIG. 18C is similar to FIG. 18B, except that the next button 1844 shown in FIG. 18B has been replaced with a finish button 1846. Those of ordinary skill in the art, of course, will appreciate that many other components than those shown in FIGS. 18A–C may be included in a wizard interface. In this exemplary embodiment, wizard interface pages include traversal buttons for traversing forward or backward amongst the pages in the wizard interface. Accordingly, FIG. 18A does not include a back button, as there is no place to go back to from an initial page. Because FIG. 18B shows an intermediate, FIG. 18B includes a back and a next button. Because FIG. 18C shows a final page, FIG. 18C includes a finish button 1846.

Figure 19:
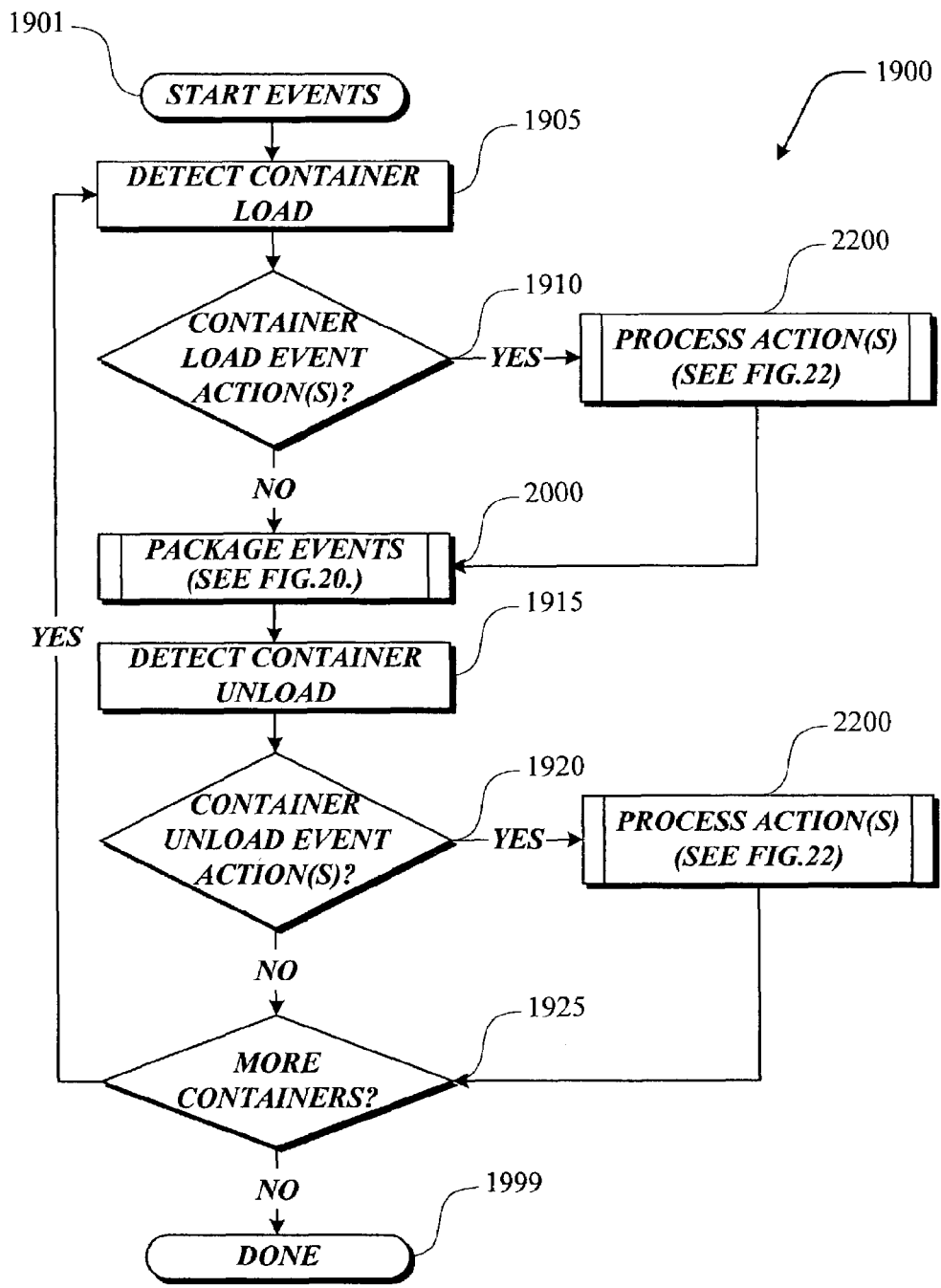
FIG. 19 is an overview flow diagram illustrating an event detection routine implemented by a client device in accordance with the present invention.

As will be readily apparent by those skilled in the art and others, the loading and unloading of components may trigger events that can be utilized to enhance the dynamic wizard interface of the present invention. FIGS. 19–22 illustrate an alternate exemplary embodiment of the invention embodying the processing and/or triggering of actions from such generated events. FIG. 19 illustrates a routine 1900 for detecting events. Routine 1900 starts at block 1901 and proceeds to block 1905, where a container load event is detected. Next, in decision block 1910, a determination is made whether any instructions in that container or any previously loaded containers are observing container load events to generate actions; if so, processing continues to subroutine block 2200, where the appropriate action or actions are processed. Subroutine 2200 is described in greater detail below with regard to FIG. 22. After subroutine 2200 ends, processing continues on to subroutine block 2000. Alternatively, if in decision block 1910 no container load event actions were found, processing proceeds directly to subroutine block 2000 where package events are detected and processed. Subroutine 2000 is discussed in greater detail below with regard to FIG. 20.

After subroutine 2000 ends, processing proceeds to block 1915. At block 1915 the unloading of a container is detected. If a container unload event is being observed by any XGL code with associated actions, decision block 1920 causes the actions to be processed by making another call to subroutine 2200. After subroutine 2200 ends, processing proceeds to decision block 1925. Alternatively, if no container unload event actions were observed (decision block 1920), processing proceeds directly to decision block 1925. In a decision block 1925, a determination is made whether more containers are to be loaded. For example, this event routine 1900 may be continually processing while loading and running a dynamic wizard. If so, decision block 1925 will cause the process to wait until there is a definitive answer that no more containers will be forthcoming such as when the dynamic wizard finishes or is canceled. If more containers will be available, processing loops back to block 1905. If in decision block 1925 it is determined that no more containers will be available, processing ends at block 1999.

As described above, subroutine 2000 detects and processes package events. Subroutine 2000 starts at block 2001 and proceeds to block 2005 where a package load event is detected. Processing then continues to decision block 2010 where a determination is made whether there are any actions associated with a detected package load event; if so, these actions are processed by subroutine 2200. As noted above, subroutine 2200 is illustrated in FIG. 22 and described below. After returning from subroutine 2200, or if no actions are associated with a package load event (decision block 2010), processing continues to subroutine block 2100 where page events are processed. Subroutine 2100 is discussed in greater detail below with reference to FIG. 21. After returning from subroutine 2100 processing continues to block 2015 where package unload events are detected.

Next, in decision block 2020 a test is made to determine if there are any actions associated with a detected package unload event. If so, processing proceeds to subroutine 2200 where these actions are processed. After returning from subroutine block 2200 or if no actions were found to be associated with the package unload event (block 2020), processing proceeds to decision block 2025 where a determination is made whether more packages are available. If so, processing loops back to block 2005, otherwise processing ends at block 2099 where subroutine 2000 returns to the routine that called it.

Figure 20:
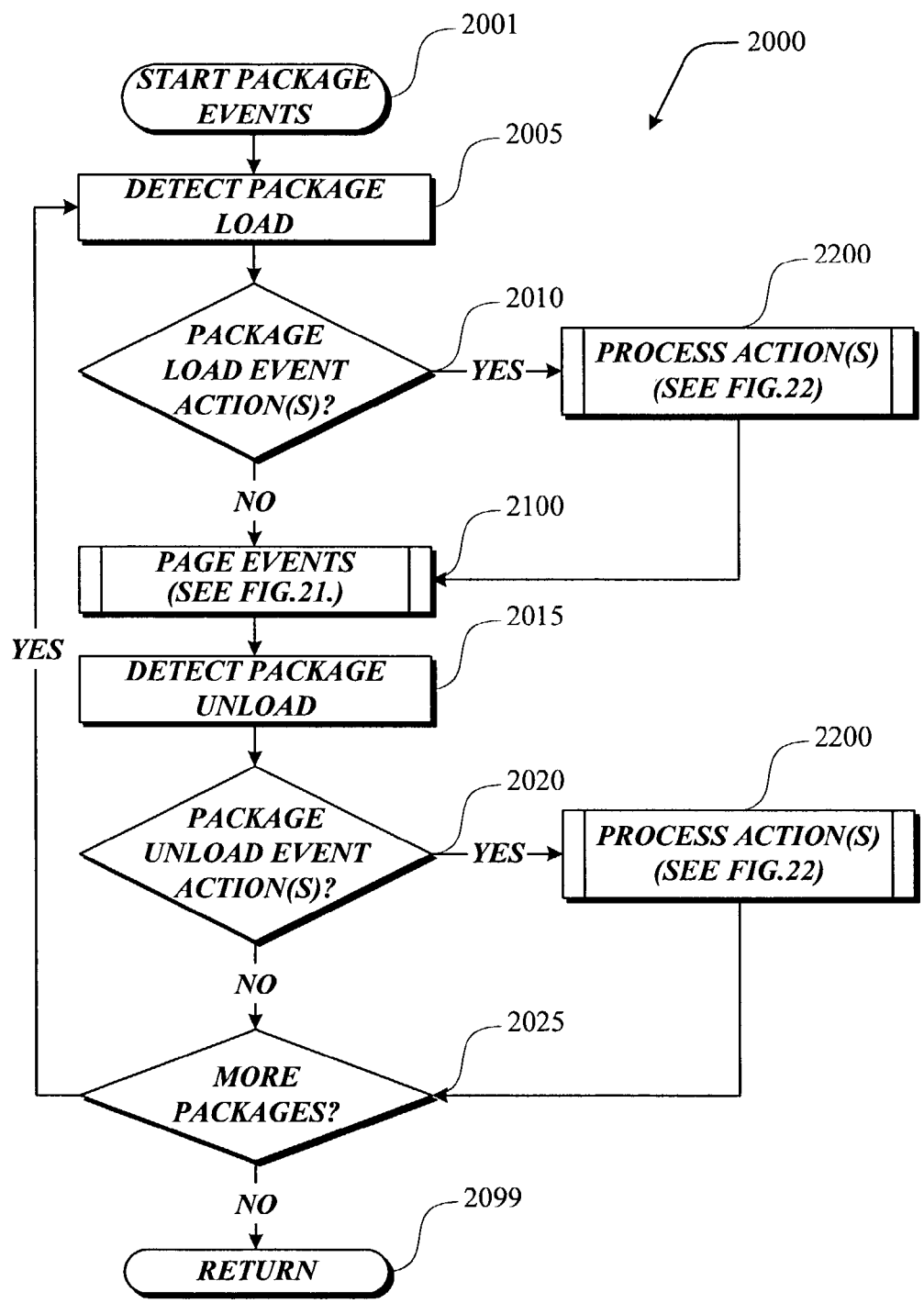
FIG. 20 is an overview flow diagram illustrating a package event detection subroutine implemented by a client device in accordance with the present invention.
Figure 21:
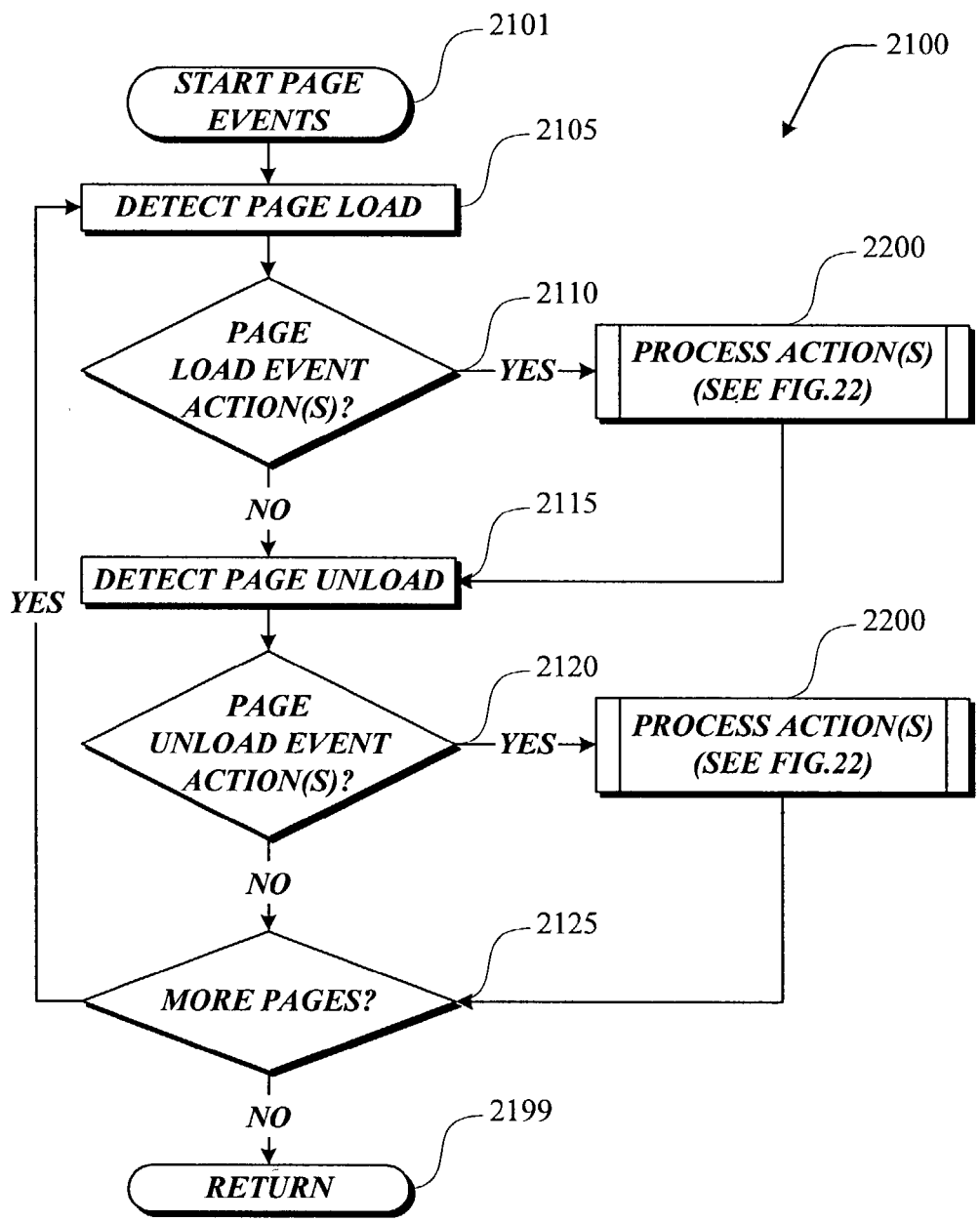
FIG. 21 is an overview flow diagram illustrating a page event detection subroutine implemented by a client device in accordance with the present invention.

FIG. 21 illustrates a page event processing subroutine 2100 similar to the package event processing subroutine 2000, shown in FIG. 20. Subroutine 2100 begins at block 2101 and proceeds to block 2105 where a page load event is detected. Next, in block 2110 a determination is made whether any actions are associated with a detected page load event; if so, processing proceeds to subroutine 2200 where these actions are processed. After returning from subroutine block 2200, or if it was found that no actions were found to be associated with the detected page load event, processing continues to block 2115 where a page unload event is detected. Next, in decision block 2120 a test is made to determine if there are actions associated with the detected page unload event. If so, processing continues to subroutine 2200 where these actions are processed. After returning from subroutine 2200, or if no actions were found to be associated with the detected page unload event processing proceeds to decision block 2125 where a determination is made whether more pages are to be processed. If so, processing loops back to block 2105. Otherwise, processing ends at block 2199 and subroutine 2100 returns to the routine that called it.

Figure 22:
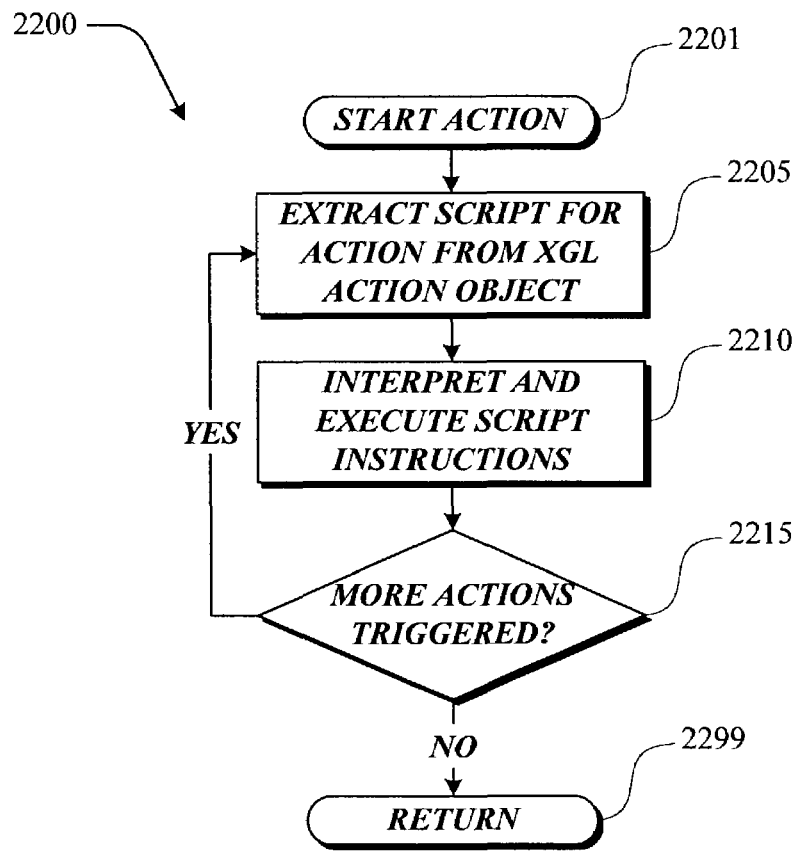
FIG. 22 is an overview flow diagram illustrating an action object processing subroutine implemented by a client device in accordance with the present invention.

FIG. 22 illustrates an action processing subroutine 2200. Subroutine 2200 starts at block 2201 and proceeds to block 2205 where the script for an action is extracted from an XGL action object. XGL action objects are special XGL objects that contain programs and/or scripts that may be downloaded and executed on the client device 300 side in an XGL wizard engine. It will be appreciated by one of ordinary skill in the art that the scripts to be executed may be in any of a variety of scripting languages and/or forms. For example, Javascript, VBscript, C# ("C-SHARP"), and the like. After the script has been extracted from the XGL action object, in block 2210, the script is interpreted and executed. Then in decision block 2215 a determination is made whether more actions have been triggered. If so, processing loops back to block 2205. If, however, in decision block 2215 it is determined that no more actions have been triggered, subroutine 2200 ends at block 2299 and processing returns to the routine that called the action processing subroutine 2200.

Those of ordinary skill in the art will appreciate that while component loading and unloading events have been used to illustrate the exemplary embodiment of the invention described herein, a myriad of other types of events may be used to trigger actions in a wizard interface. For example, events may be triggered by validation failures typographical errors and/or user actions. These examples should be considered as illustrative and not limiting.

Figure 23:
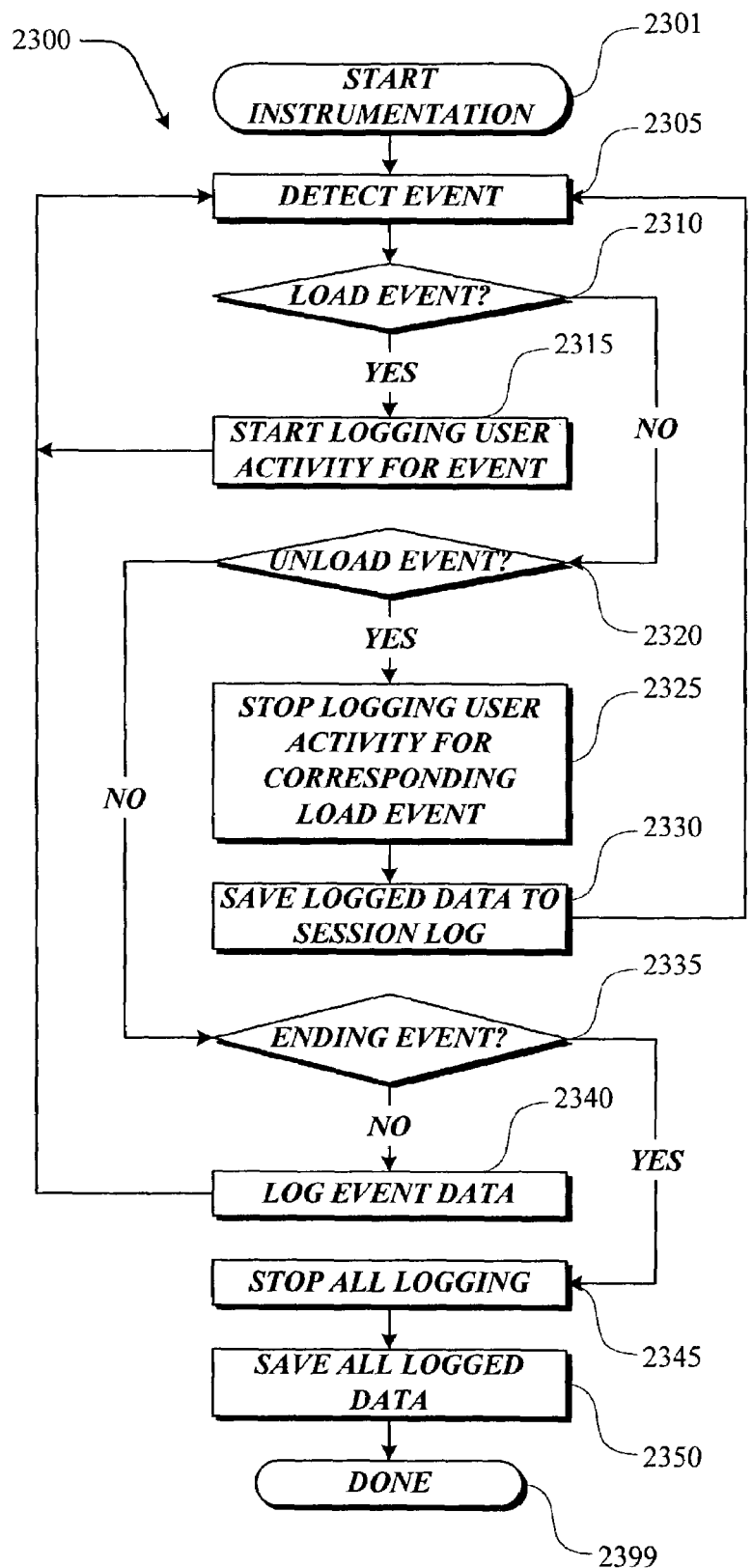
FIG. 23 is an overview flow diagram illustrating an instrumentation routine implemented by a client device in accordance with the present invention.

In addition to dynamically creating a wizard interface, the present invention can also be used for instrumentation, such as tracking user interactions with a wizard interface. FIG. 23 illustrates an exemplary instrumentation routine for tracking user interactions with a dynamic wizard interface formed in accordance with the present invention. Routine 2300 begins at block 2301 and proceeds to block 2305 where an event is detected. Next, in decision block 2310 a determination is made whether this was a load event for some wizard component. If so, in block 2315, the instrumentation routine 2300 starts logging user activity associated with the load event. For example, if a user loads a page in a wizard interface, logging of activity on that page would start with the page load event. Processing then loops back to block 2305 and waits until the next event is detected.

If in decision block 2310 a determination is made that a load event was not detected, then, in decision block 2320 a determination is made whether the detected event was an unload event. If so, in block 2325, the unload event causes routine 2300 to stop logging user activity for the load event that corresponds to the unload event. For example, if a user loads a package and then the package is unloaded, the unloading of the package stops the logging created when the package was loaded. Next, in block 2330 the logged data is saved to a session log associated with the user. Processing then loops back to block 2305.

If in decision block 2320 a determination was made that an unload event was not detected, processing proceeds to decision block 2335 where a determination is made whether the event was an ending event. If not, the event data is logged in block 2340 and processing loops back to block 2305 to wait for a new event to be detected. However, if in decision block 2335 an ending event was detected processing proceeds to block 2345 where all logging is stopped. Next, in block 2350 all logged data is saved and, then, processing ends at block 2399.

Figure 24A:
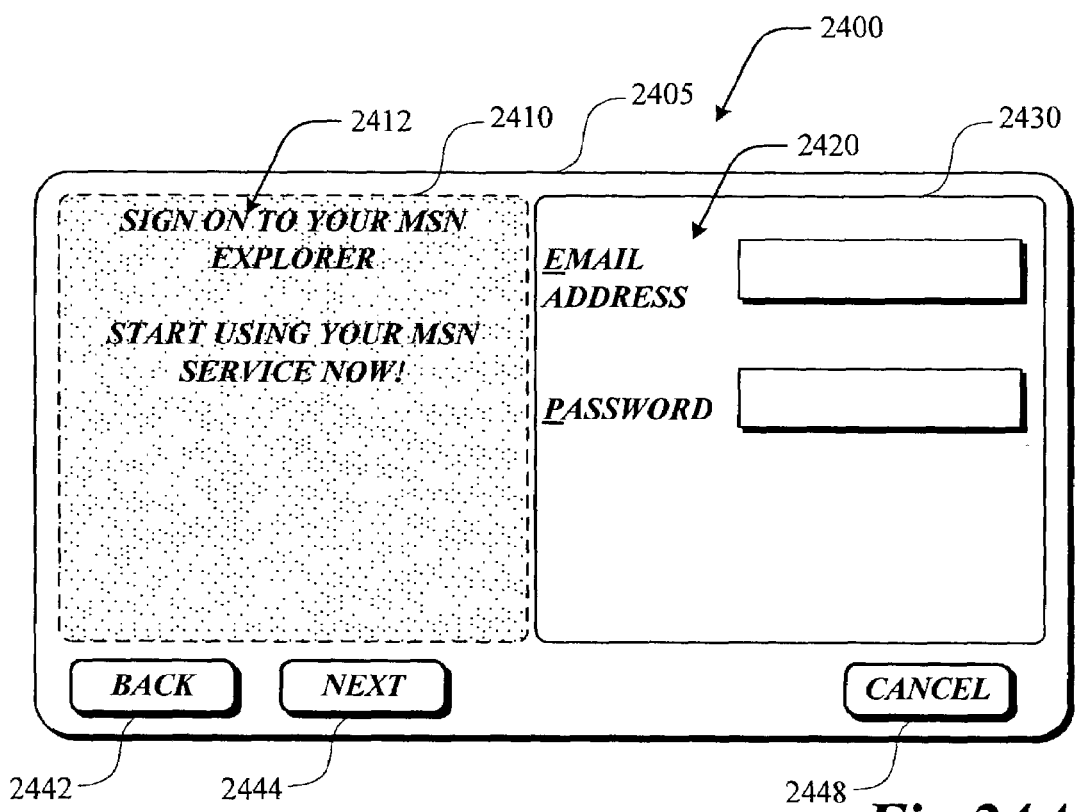
FIG. 24A shows an exemplary wizard interface page in accordance with the present invention.
Figure 24B:
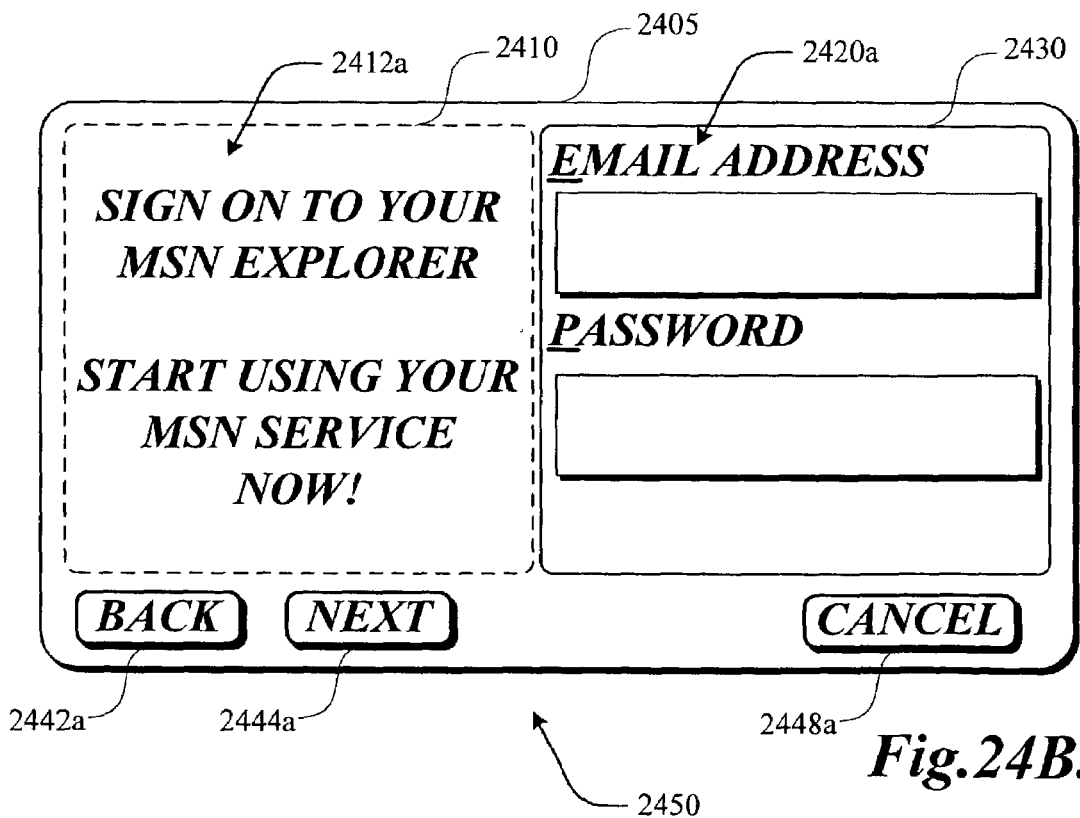
FIG. 24B shows an exemplary wizard interface page with enhanced accessibility in accordance with the present invention.

The XGL structure of a dynamic wizard interface formed in accordance with the exemplary embodiment of the present invention described herein greatly enhances the customization, localization and accessibility of dynamic wizard interfaces. For example, FIG. 24A illustrates an exemplary wizard page 2400 formed in accordance with the present invention. The page includes a back button 2442, a next button 2444, and a cancel button 2448, along with a left panel 2410, a right panel 2430, all surrounded by the wizard page frame 2405. Included in the left panel 2410 is explanatory text 2412. The right panel 2430 includes a number of labeled fields 2420. While the wizard page 2400 illustrated in FIG. 24A may be readily understandable by most users of a wizard interface, some users with special needs might require enhancement to improve their ability to interact with such a wizard interface. Accordingly, FIG. 24B shows a high contrast version 2450 of the wizard page 2400 shown in FIG. 24A. The high contrast wizard page 2450 includes essentially the same information as the wizard page 2400 shown in FIG. 24A, except the text 2412a of the left panel 2410 is presented without a colored background and has an increased font size. Both changes are designed to improve contrast and enhance readability. Likewise, the labeled fields 2420a of the right panel 2430 of the high contrast wizard page 2450 are presented in a high contrast manner. Additionally, the text in the back button 2442a, next button 2444a, and cancel button 2448a is also increased in font size for enhanced visualization. Encoding the dynamic wizard interface components in XGL allows the client side of the wizard engine to determine which templates will be used and thereby dictate how the dynamic wizard will be presented to an end user.

One of ordinary skill in the art will appreciate that even more dramatic examples than those shown in FIGS. 24A–24B fall with the scope of the present invention. For example, because the client device 300 is in communication with the XGL server 400 as the wizard packages are being assembled into a container, special pages and/or packages may be gathered that conform to the specified needs of the portion of the wizard engine located on the client device 300. If the client device is utilizing the French language as the language of choice, the packages gathered together in the XGL containers of the dynamic wizard will include French language for display in the dynamic wizard interface. Some of the localization and customization may simply be determined by which templates and/or wizard engine is resident on the client device 300. As already noted, high contrast templates may be resident on the client device. Additional templates might include a text-to-audio converter or a visual display to Braille conversion template located on the client device 300. None of these enhancements affect which packages and/or pages are assembled to form the dynamic wizard interface presented to the user. Rather, they simply fine tune the presentation to a form more usable by the end user.

While the preferred embodiment of the invention has been illustrated and described, it will be appreciated that various changes can be made therein without departing from the spirit and scope of the invention.

The emblodiments of the invention in which an exclusive property or privilage is claimed are defined as follows:

1. A computer-implemented method for transforming a wizard container into a wizard interface, comprising:
   extracting a XGL (experience generation language) package from the wizard container, said package containing a self-described object corresponding to a component of the wizard interface, said package being a live XGL package containing live data, said live XGL package being a XGL sub-package contained in another XGL package;
   retrieving one or more live objects embodying said live data from a remote location;
   transforming said self-described object into said corresponding component of the wizard interface according to an object template, independent of a type of computer platform performing the transformation; and
   depicting a first page of said wizard interface.

2. The method of claim 1, wherein said object is described using XML.

3. The method of claim 1, wherein the XGL package is not retrieved if it has already been extracted for the wizard interface.

4. The method of claim 1, further comprising laying out said component in the wizard interface according to a layout template.

5. The method of claim 1, wherein the wizard container has an indication of a specific layout template; retrieving said layout template and utilizing the retrieved layout template for laying out said components.

6. The method of claim 1, further comprising interpreting an information data structure having an element matching said self-described object and modifying said self-described object to include data stored in said element.

7. The method of claim 6 wherein said data structure is retrieved from a remote location.

8. The method of claim 6, wherein said data structure is retrieved from a local location.

9. The method of claim 8, wherein said data structure is retrieved after a previous interaction with the wizard interface was cancelled.

10. The method of claim 1, wherein depicting a first page further comprises transmitting a formatted page to a second computing device.

11. The method of claim 10, wherein said second computing device depicts said formatted page with web client software.

12. The method of claim 1, further comprising receiving an indication that an additional XGL package is needed; retrieving a second container with said additional XGL package.

13. The method of claim 12, wherein said indication is received when a page at said wizard interface is depicted containing a logical branch.

14. The method of claim 13, wherein said logical branch is cached.

15. A computer-readable storage medium having storable computer-executable instructions for transforming a wizard container into a wizard interface by:
   extracting a XGL(experience generation language) package from the wizard container, said package containing a self-described object corresponding to a component of the wizard interface, said package being a live XGL package containing live data;
   retrieving one or more live objects embodying said live data from a remote location;
   transforming said self-described object into said corresponding component of the wizard interface according to an object template, independent of a type of computer platform performing the transformation; and
   depicting a first page of said wizard interface.

16. The computer-readable storage medium of claim 15, wherein the XGL package is not retrieved if it has already been extracted for the wizard interface.

17. The computer-readable storage medium of claim 15, further comprising laying out said component in the wizard interface according to a layout template.

18. The computer-readable storage medium of claim 15, further comprising interpreting an information data structure having an element matching said self-described object and modifying said self-described object to include data stored in said element.

19. The computer-readable storage medium of claim 15, wherein depicting a first page further comprises transmitting a formatted page to a second computing device.

20. The computer-readable storage medium of claim 15, further comprising receiving an indication that an additional XGL package is needed;
   retrieving a second container with said additional XGL package.

21. A computing device having a processor, a memory and an operating environment, the computing device operable to transform a wizard container into a wizard interface by:
   extracting one or more XGL (experience generation language) packages from the wizard container, each XGL package containing one or more self-described objects corresponding to components of the wizard interface, said one or more packages including a live XGL package containing live data;
   retrieving one or more live objects embodying said live data from a remote location;
   transforming said self-described objects into said corresponding components of the wizard interface according to an object template, independent of a type of computer platform performing the transformation; and
   depicting a first page of said wizard interface.

22. A computing device in communication with a server device and a client device, the computing device operative to:

receiving a wizard container;

extracting one or more XGL (experience generation language) packages from said wizard container, each XGL package containing one or more self-described objects corresponding to components of a wizard interface said one or more packages including a live XGL package containing live data;

retrieving one or more live objects embodying said live data from a remote location;

transforming said self-described objects into representations of said components of said wizard interface, independent of a type of computer platform performing the transformation;

laying out said representations of said components into a formatted page; and transmitting said formatted page to said client device.

* * * * *